US011481264B2

(12) United States Patent
Nasu et al.

(10) Patent No.: US 11,481,264 B2
(45) Date of Patent: Oct. 25, 2022

(54) DATA PROCESSING DEVICE, MONITORING METHOD, AND PROGRAM

(71) Applicant: Mitsubishi Electric Corporation, Tokyo (JP)

(72) Inventors: Osamu Nasu, Tokyo (JP); Jijun Jin, Tokyo (JP); Ryo Kashiwagi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 107 days.

(21) Appl. No.: 17/049,574

(22) PCT Filed: Apr. 27, 2018

(86) PCT No.: PCT/JP2018/017234
§ 371 (c)(1),
(2) Date: Oct. 22, 2020

(87) PCT Pub. No.: WO2019/207773
PCT Pub. Date: Oct. 31, 2019

(65) Prior Publication Data
US 2021/0240481 A1 Aug. 5, 2021

(51) Int. Cl.
G06F 11/00 (2006.01)
G06F 11/07 (2006.01)
G06F 11/30 (2006.01)

(52) U.S. Cl.
CPC ...... *G06F 11/0736* (2013.01); *G06F 11/0715* (2013.01); *G06F 11/0754* (2013.01);
(Continued)

(58) Field of Classification Search
CPC ............. G06F 11/0715; G06F 11/3037; G06F 11/0736; G06F 11/0745; G06F 11/0754;
(Continued)

(56) References Cited

U.S. PATENT DOCUMENTS 6,430,620 B1    8/2002  Omura et al.
10,599,478 B1 * 3/2020  Ghare ............... G06F 16/24568
(Continued)

FOREIGN PATENT DOCUMENTS

JP    11-184780 A    7/1999
JP    2001-022595 A  1/2001
(Continued)

OTHER PUBLICATIONS

International Search Report and Written Opinion dated Aug. 7, 2018 for PCT/JP2018/017234 filed on Apr. 27, 2018, 7 pages including English Translation of the International Search.
(Continued)

*Primary Examiner* — Joseph D Manoskey
(74) *Attorney, Agent, or Firm* — Xsensus LLP

(57) ABSTRACT

A data processing apparatus includes a first processing unit that executes real-time processing with respect to data, a second processing unit that executes batch processing with respect to data that is output from the first processing unit as a result of processing by the first processing unit, and a monitor that monitors a status of the processing by the first processing unit and a status of processing by the second processing unit. The first processing unit includes a plurality of subprocessing units and buffers, and the second processing unit also includes a plurality of subprocessing units and buffers. The second processing unit includes a storage. The monitor includes a first monitor that monitors, for each of the buffers included in the first processing unit, an amount of the data stored in the corresponding buffer and a second monitor that monitors a total amount of the data stored in the buffers included in the second processing unit and the data stored in the storage.

14 Claims, 20 Drawing Sheets

(52) U.S. Cl.
CPC ...... *G06F 11/0766* (2013.01); *G06F 11/3013* (2013.01); *G06F 11/3037* (2013.01)

(58) Field of Classification Search
CPC ............. G06F 11/0766; G06F 11/3013; G06F 9/3885; G06F 9/345; G06F 9/544
See application file for complete search history.

(56) References Cited

U.S. PATENT DOCUMENTS

| | | | |
|---|---|---|---|
| 10,678,590 B1* | 6/2020 | Sharma | ............. G06F 9/544 |
| 2006/0047998 A1* | 3/2006 | Darcy | ............. G06F 3/0656 |
| | | | 714/6.12 |
| 2006/0168013 A1* | 7/2006 | Wilson | ............. H04L 43/08 |
| | | | 709/206 |
| 2011/0080834 A1 | 4/2011 | Hirota et al. | |
| 2015/0254106 A1 | 9/2015 | Takase et al. | |

FOREIGN PATENT DOCUMENTS

| | | |
|---|---|---|
| JP | 2001-034320 A | 2/2001 |
| JP | 2006-259928 A | 9/2006 |
| JP | 2011-078039 A | 4/2011 |
| JP | 2015-170189 A | 9/2015 |
| JP | 2017-135858 A | 8/2017 |

OTHER PUBLICATIONS

Notification of Reasons for Refusal received for Japanese Patent Application No. 2019-526024, dated Jul. 2, 2019, 7 pages including English Translation.

Notification of Reasons for Refusal received for Japanese Patent Application No. 2019-526024, dated Feb. 4, 2020, 9 pages including English Translation.

* cited by examiner

FIG. 10

| SETTING RELATING TO ERROR NOTIFICATION | | |
|---|---|---|
| FIRST PROCESSING UNIT | ABNORMALITY IN BUFFER [112] | SEND NOTIFICATION |
| | ABNORMALITY IN BUFFER [114] | DO NOT SEND NOTIFICATION |
| | ⋮ | ⋮ |
| | ABNORMALITY IN BUFFER [116] | SEND NOTIFICATION |
| ABNORMALITY IN SECOND PROCESSING UNIT | | DO NOT SEND NOTIFICATION |

FIG. 13

| ABNORMALITY DETERMINATION CONDITION | | |
|---|---|---|
| AMOUNT OF DATA STORED IN FIRST PROCESSING UNIT | BUFFER [112] | EXCEEDS THRESHOLD VALUE (70%) |
| | BUFFER [114] | EXCEEDS THRESHOLD VALUE (70%) |
| | ⋮ | ⋮ |
| | BUFFER [116] | EXCEEDS THRESHOLD VALUE (70%) |
| TOTAL AMOUNT OF DATA STORED IN THE BUFFERS OF THE SECOND PROCESSING UNIT | | EXCEEDS THRESHOLD VALUE (50%) |

FIG. 14

| ERROR OCCURRENCE HISTORY ||
|---|---|
| DATE AND TIME | CONTENT OF ABNORMALITY |
| MARCH 15, 2018<br>13:45:59 | OUT OF FREE SPACE<br>IN BUFFER [114] |
| ⋮ | ⋮ |

DATA PROCESSING DEVICE, MONITORING METHOD, AND PROGRAM

CROSS-REFERENCE TO RELATED APPLICATION

The present application is based on PCT filing PCT/JP2018/017234, filed Apr. 27, 2018, the entire contents of which are incorporated herein by reference.

TECHNICAL FIELD

The present disclosure relates to a data processing apparatus, a monitoring method, and a program.

BACKGROUND ART

In a facility, such as a factory, sequential processing of data collected in relatively short periods from the facility is widely performed to achieve a production process, inspection process, and other various types of processes. Such data processing is preferably executed in an environment that guarantees a certain degree of real-timeliness. Thus, utilizing a technique of a real-time operating system (OS) to process data is conceivable (refer to, for example, Patent Literature 1).

Patent Literature 1 discloses a technique for improving utilization efficiency of processing resources by monitoring a status of real-time processing and adjusting parameters relating to progress of the real-time processing. According to this technique, filled status for each stream buffer is monitored as the progress of the real-time processing.

CITATION LIST

Patent Literature

Patent Literature 1: Unexamined Japanese Patent Application Publication No. 2001-22595

SUMMARY OF INVENTION

Technical Problem

As an amount of data collected in a facility increases and a processing result is used in a wide variety of applications in recent years, various types of processing are executed with respect to data, such as processing that is required to be executed in real time and is suitably executed using a real-time OS, and processing that is difficult to execute in real time and is suitably executed by batch processing performed using a general purpose OS that is a non-real-time OS. Thus, executing real-time processing in an environment that ensures real-timeliness, and then following the real-time processing, executing batch processing using a general-purpose OS (a non-real-time OS), is conceivable.

Furthermore, as the needs of a user for data processing are diversifying, there is a need for a system that enables the user to freely combine content of processing executed using a real-time OS and content of processing executed using a general-purpose OS and enables execution of the processing. Using such a system, the user may set processing so as to exceed processing capacity of a processing device, which adversely affects the processing result, and the user may need to grasp processing status, such as filled statuses of buffers, for review of the process settings. Thus, directly monitoring a filled status for each buffer arranged between processing elements included in a series of processing, as described in Patent Literature 1, is conceivable. However, in a system for execution of data processing that comprises a series of processes including processing executed using a real-time OS and processing executed using a general purpose OS, appropriately grasping a status of the processing is difficult when only monitoring the filled status for each buffer.

The present disclosure is made in view of the above-described circumstances, and an objective of the present disclosure is to obtain a monitoring result that indicates a status of data processing appropriately.

Solution to Problem

To achieve the aforementioned objective, the data processing apparatus of the present disclosure includes:
first processing means for executing real-time processing with respect to data;
second processing means for executing batch processing with respect to data that is output from the first processing means as a result of processing by the first processing means; and
monitor means for monitoring a status of the processing by the first processing means and a status of processing by the second processing means, wherein
each of the first processing means and the second processing means includes:
  a plurality of subprocessing means for executing subprocesses included in the processing executed with respect to data; and
  buffers to store data output from the plurality of subprocessing means, each of the buffers storing data output from a corresponding subprocessing means,
the second processing means further includes storage means for storing the data output from the first processing means and for providing the stored data to any one of the plurality of subprocessing means included in the second processing means, and
the monitor means includes:
  first monitor means for monitoring, for each of the buffers included in the first processing means, an amount of the data stored in the corresponding buffer; and
  second monitor means for monitoring a total amount of (i) the data stored in the buffers included in the second processing means and (ii) the data stored in the storage means.

Advantageous Effects of Invention

According to the present disclosure, the monitor means included in the data processing apparatus includes (i) first monitor means for monitoring, for each of the buffers included in the first processing means, an amount of the data stored in the corresponding buffer and (ii) second monitor means for monitoring a total amount of the data stored in the buffers included in the second processing means and the data stored in the storage means. Thus information that matches the characteristics of both the processing means can be provided to the user, and the user can grasp both a status of the processing by the first processing means and a status of the processing by the second processing means, and can utilize the statuses to review a processing setting.

BRIEF DESCRIPTION OF DRAWINGS

FIG. 10 illustrates an example setting relating to error notification according to the embodiment;

FIG. 13 illustrates an example of abnormality determination conditions according to the embodiment;

FIG. 14 illustrates an example of error occurrence history according to the embodiment;

DESCRIPTION OF EMBODIMENTS

Hereinafter, a data processing apparatus 10 according to an embodiment of the present disclosure is described in detail with reference to the drawings.

Embodiment

Figure 1:
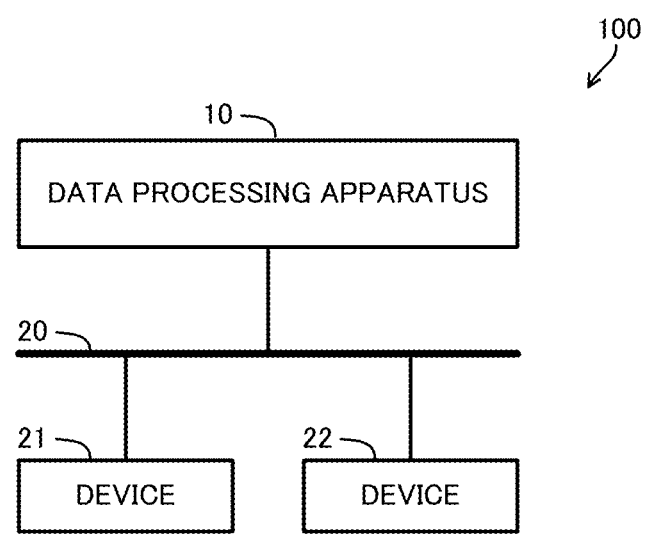
FIG. 1 is a block diagram illustrating system configuration of a processing system according to an embodiment of the present disclosure.

The data processing apparatus 10 according to the present embodiment is an industrial personal computer (IPC) arranged in a factory. As illustrated in FIG. 1, the data processing apparatus 10 is connected via an industrial network 20 to devices 21 and 22 that are arranged on a production line of a factory, and is included in a processing system 100 as a factory automation (FA) system. The data processing apparatus 10 executes processing of data collected from the device 21 via the network 20 and outputs, to the device 22, a control instruction according to a result of the processing. The device 21 is a sensor, and the device 22 is an actuator or a robot.

Figure 2:
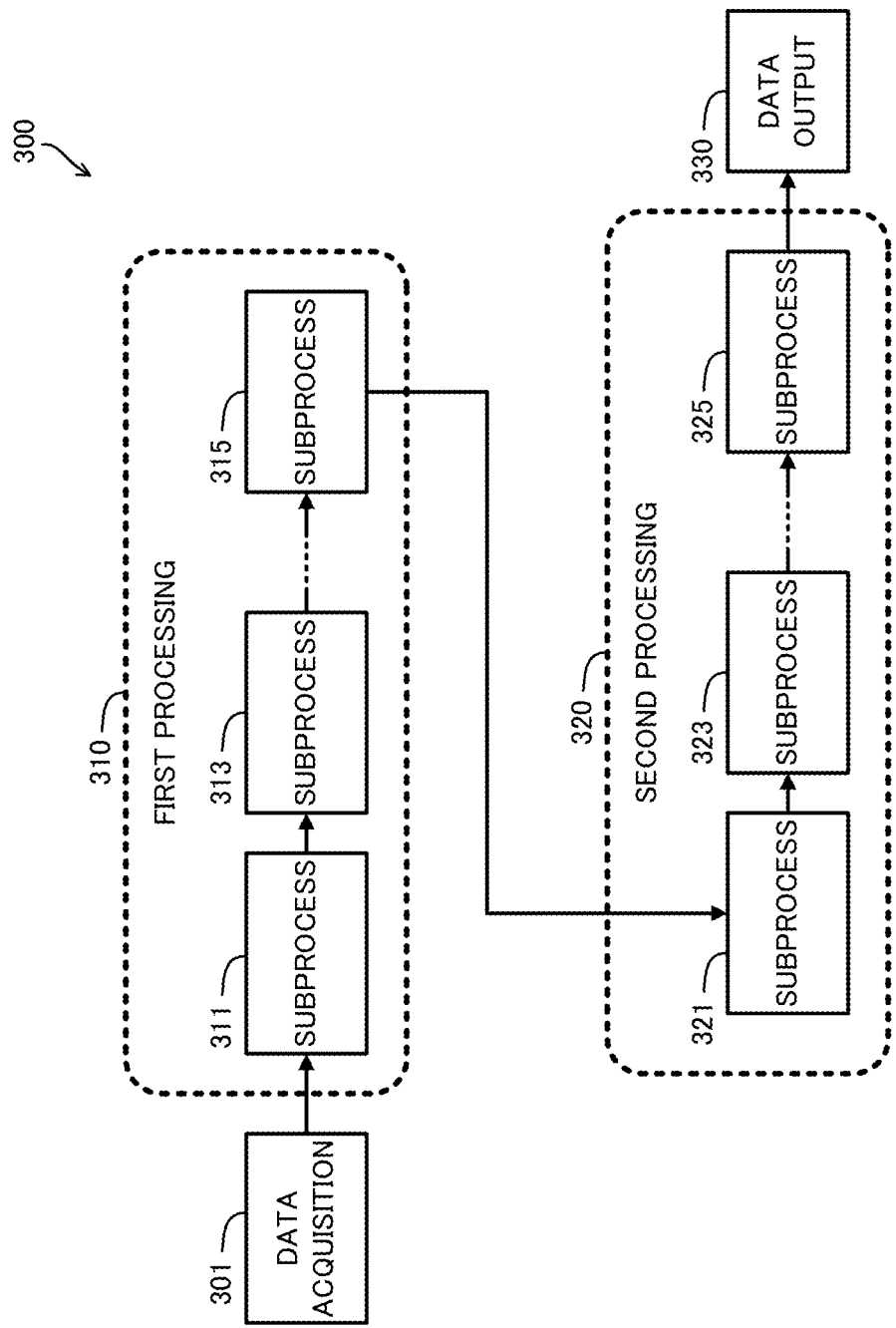
FIG. 2 schematically illustrates a flow of data processing according to the embodiment.

FIG. 2 schematically illustrates data processing executed by the data processing apparatus 10. As illustrated in FIG. 2, data processing 300 executed by the data processing apparatus 10 is achieved by executing a data acquisition 301, first processing 310, second processing 320, and a data output 330, in order. The arrows in FIG. 2 indicate transmission of data. For example, the first processing 310 is executed with respect to data acquired by execution of the data acquisition 301, the second processing 320 is executed with respect to data indicating a result of processing in the first processing 310, and data indicating a result of processing in the second processing 320 is a processing target of the data output 330.

The data acquisition 301 corresponds to processing of receiving data from the device 21 via the network 20 illustrated in FIG. 1. As the device 21 periodically transmits data indicating a sensing result, the data acquisition 301 is executed periodically, for example, with a period of 10 milliseconds, 100 milliseconds, or one second. The data indicating the sensing result is, for example, a digital value of 8 bits or 16 bits.

The first processing 310 is executed periodically as real-time processing in response to execution of the data acquisition 301, and content of such processing is simpler and has lowered design freedom in comparison to the second processing 320. The first processing 310 is executed as stream data processing with a period equivalent to that of the data acquisition 301. The first processing 310 is achieved by executing subprocesses 311, 313, and 315, in order. The subprocesses 311, 313, and 315 are, for example, raising processing of raising a value that is lower than or equal to a predetermined threshold value, cutting-off processing of cutting off a value that is higher than or equal to a predetermined threshold value, and scaling processing of multiplying by a predetermined constant.

However, the subprocesses 311, 313, and 315 may be rounding-off processing different from the raising processing and the cutting-off processing, shift processing of adding a predetermined offset value, or still other processing. Furthermore, although FIG. 2 illustrates three subprocesses included in the first processing 310 (that is, the subprocesses 311, 313, and 315), this is a representative example. The number of the subprocesses may be two or less, or may be four or more.

The second processing 320 is batch processing that is repeatedly executed in response to execution of the first processing 310. The "batch processing" means processing data asynchronously with respect to the processing in the first processing 310. As content of the second processing 320 is more complicated and has higher design freedom in comparison to the first processing 310 and ensuring real-timeliness of the second processing 320 is difficult, the second processing 320 is generally executed aperiodically. The second processing 320 is achieved by executing subprocesses 321, 323, and 325, in order. The subprocesses 321, 323, and 325 are, for example, moving average processing of calculating a moving average, determination processing of determining whether a value of the processing target is higher than a predetermined threshold value, and processing of determining content of the control instruction to the device 22 illustrated in FIG. 1. These subprocesses 321, 323, and 325 enable outputting of a specific control instruction only when a value obtained by removing noise from the sensing result by performing the moving average processing is higher than the threshold value.

However, the subprocesses 321, 323, and 325 may be filtering processing or statistical processing that are different from the moving average calculation processing, conversion processing such as fast Fourier transform (FFT), or other processing. Further, although FIG. 2 illustrates an example in which three subprocesses are included in the second processing 320 (that is, the subprocesses 321, 323, and 325), the number of the subprocesses may be two or less, or may be four or more. The second processing 320 may be executed aperiodically to process a large amount of data that is acquired by executing the data acquisition 301 repeatedly.

The data output 330 corresponds to processing of transmitting, to the device 22, a result of the processing in the second processing 320 via the network 20 illustrated in FIG. 1.

Figure 3:
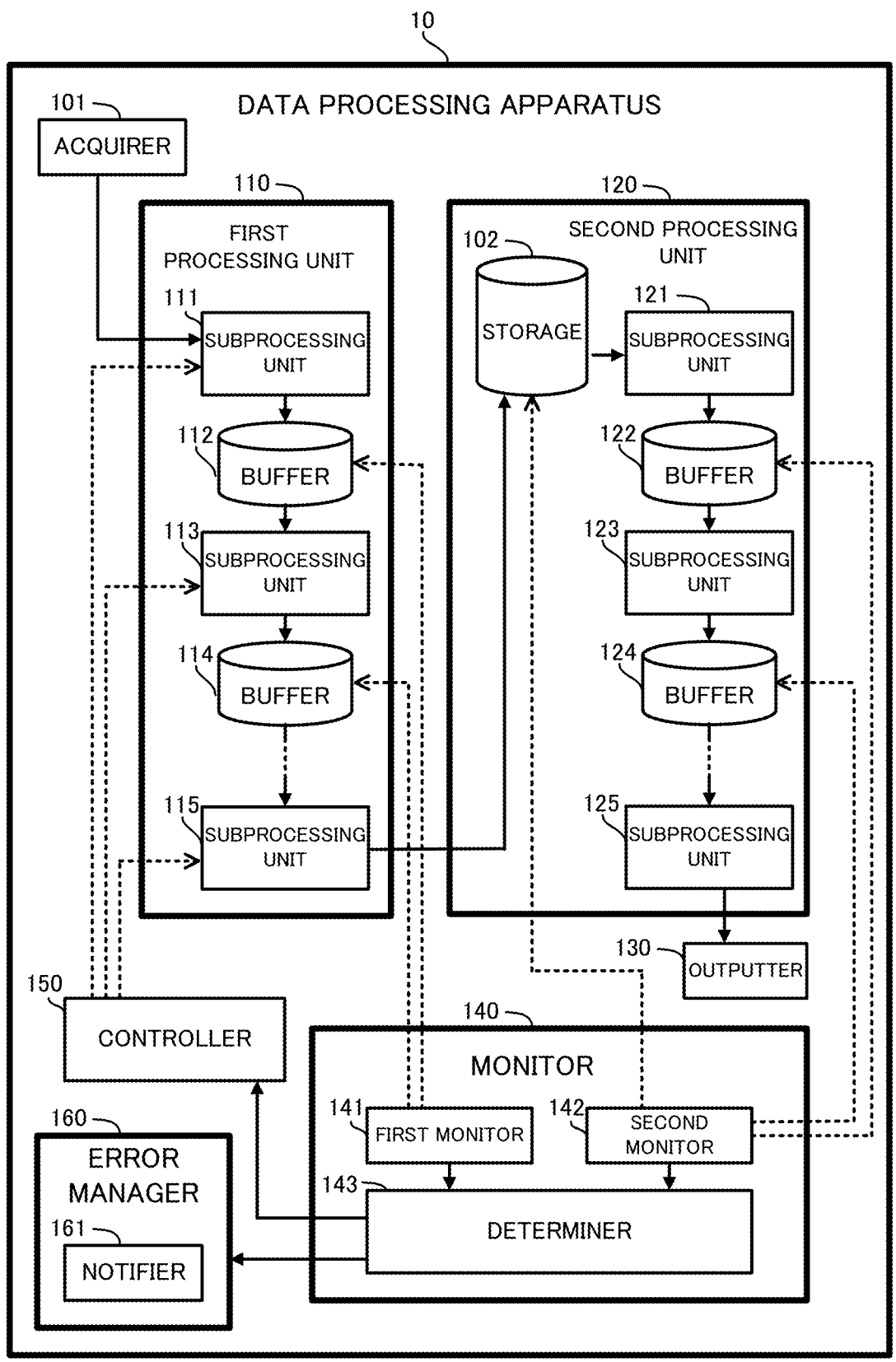
FIG. 3 illustrates functional configuration of a data processing apparatus according to the embodiment.

To execute the data processing 300 illustrated in FIG. 2 and to monitor a status of the processing, the data processing apparatus 10 functionally includes elements as illustrated in FIG. 3. Specifically, the data processing apparatus 10 includes an acquirer 101 that repeatedly acquires data that is the processing target, a first processing unit 110 that executes processing of the acquired data, a second processing unit 120 that executes processing of data that is a result of the processing by the first processing unit 110, an outputter 130 that outputs data as a result of the processing by the second processing unit 120 to the exterior, a monitor 140 that monitors a status of the processing by the first processing unit 110 and a status of the processing by the second processing unit 120, a controller 150 that controls an operation of the first processing unit 110, and an error manager 160 that manages errors that occur during the processing by the first processing unit 110 and the second processing unit 120. The data acquisition 301, the first processing 310, the second processing 320, and the data output 330 that are illustrated in FIG. 2 are respectively executed by the acquirer 101, the first processing unit 110, the second processing unit 120, and the outputter 130.

The first processing unit 110 includes subprocessing units 111, 113, and 115 that execute respectively the subprocesses 311, 313, and 315 illustrated in FIG. 2, and buffers 112 and 114 that temporarily store data output from any one of the subprocessing units included in the first processing unit 110 and provide the stored data to the next subprocessing unit. The first processing unit 110 functions as the first processing means in the claims.

The subprocessing unit 111 executes a subprocess with respect to data provided by the acquirer 101 and stores, in the subsequent-stage buffer 112, data indicating a result of the subprocess. The subprocessing unit 113 executes a subprocess with respect to data read from the preceding-stage buffer 112 and stores, in the subsequent-stage buffer 114, data indicating a result of the subprocess. The subprocessing unit 115 executes a subprocess with respect to data read from a non-illustrated preceding-stage buffer and stores, in a storage 102, data indicating a result of the subprocess. Each of the buffers 112,114 has the capacity of, for example, 10 bytes or 20 bytes. However, this is not limiting, and any capacity may be employed. The subprocessing units 111 and 113 function as the processing means in the claims, and the buffers 112 and 114 function as the buffers in the claims.

Figure 4:
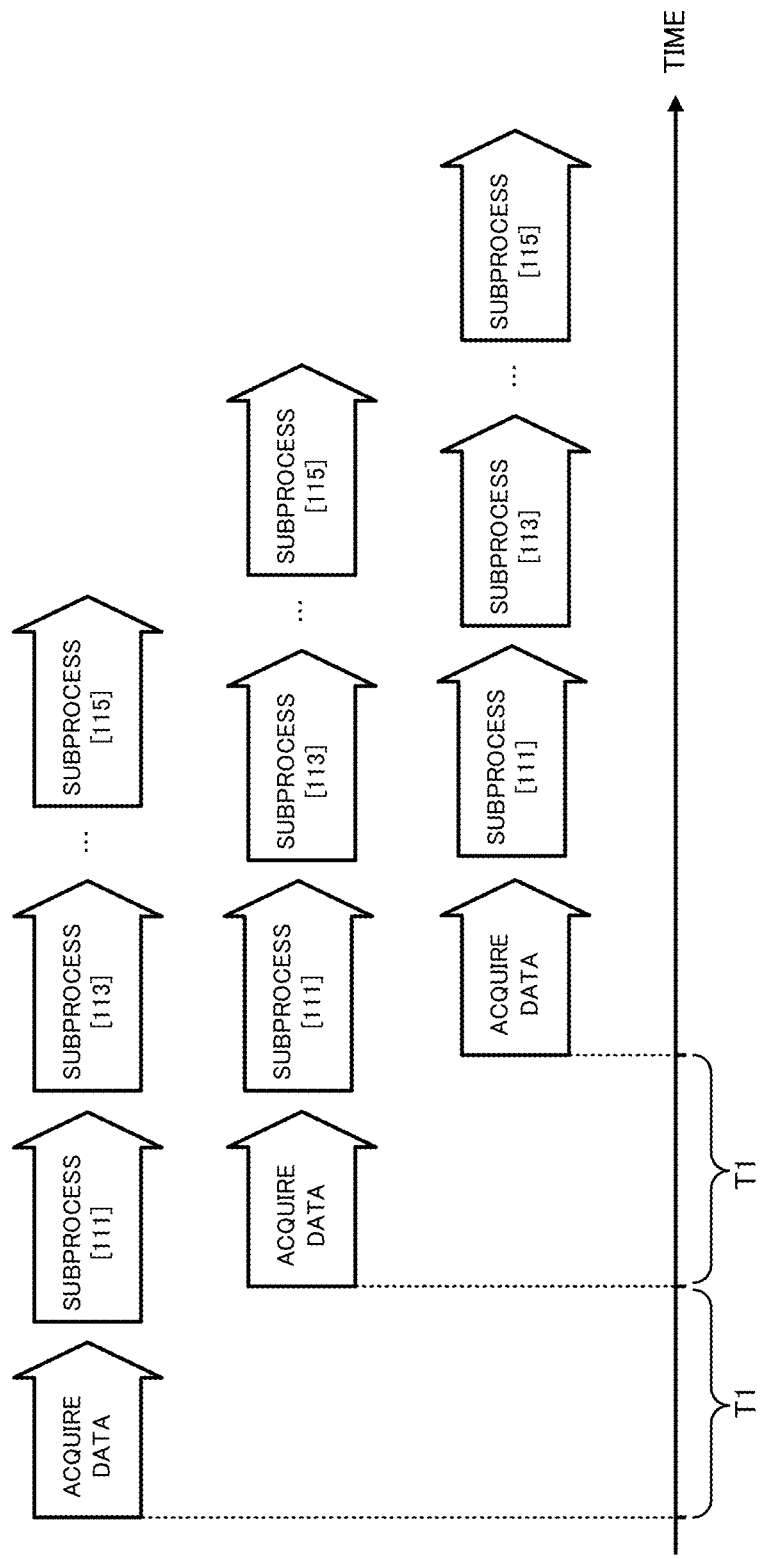
FIG. 4 is a diagram for explanation of iterative processing executed by a first processing unit and an acquirer according to the embodiment.

FIG. 4 schematically illustrates progress of iterative processing executed by the acquirer 101 and the first processing unit 110. In FIG. 4, the numbers followed by the term "subprocess" each indicate a reference sign of a corresponding subprocessing unit of the subprocessing units 111, 113, or 115. For example, "subprocess [111]" is executed by the subprocessing unit 111. As illustrated in FIG. 4, the subprocesses included in the stream data processing are each executed within a period less than or equal to a period T1 for acquisition of data, and these subprocesses are each executed periodically with a period T1. In order to achieve real-timeliness of the processing, the acquirer 101 and the first processing unit 110 are preferably provided to operate on a real-time operating system (OS).

Again with reference to FIG. 3, the second processing unit 120 includes: a storage 102 that temporarily stores data that is output from the first processing unit 110 as a result of the processing by the first processing unit 110; subprocessing units 121, 123, and 125 that each execute a corresponding subprocess of subprocesses 321, 323, and 325 illustrated in FIG. 2; and buffers 122 and 124 that temporarily store data output from any one of the subprocessing units included in the second processing unit 120 and provide the stored data to the next subprocessing unit. The second processing unit 120 functions as the second processing means in the claims.

The subprocessing unit 121 executes a subprocess with respect to data read from the storage 102 and stores, in the subsequent-stage buffer 122, data indicating a result of the subprocess. The subprocessing unit 123 executes a subprocess with respect to data read from the preceding-stage buffer 122 and stores, in the subsequent-stage buffer 124, data indicating a result of the subprocess. The subprocessing unit 125 executes a subprocess with respect to data read from non-illustrated preceding-stage buffer and transmits, to the outputter 130, data indicating a result of the subprocess. Each of the buffers 122,124 has the capacity of, for example, 10 bytes or 20 bytes. However, this is not limiting, and any capacity may be employed. The subprocessing units 121 and 123 function as the processing means in the claims, and the buffers 122 and 124 function as the buffers in the claims.

Figure 5:
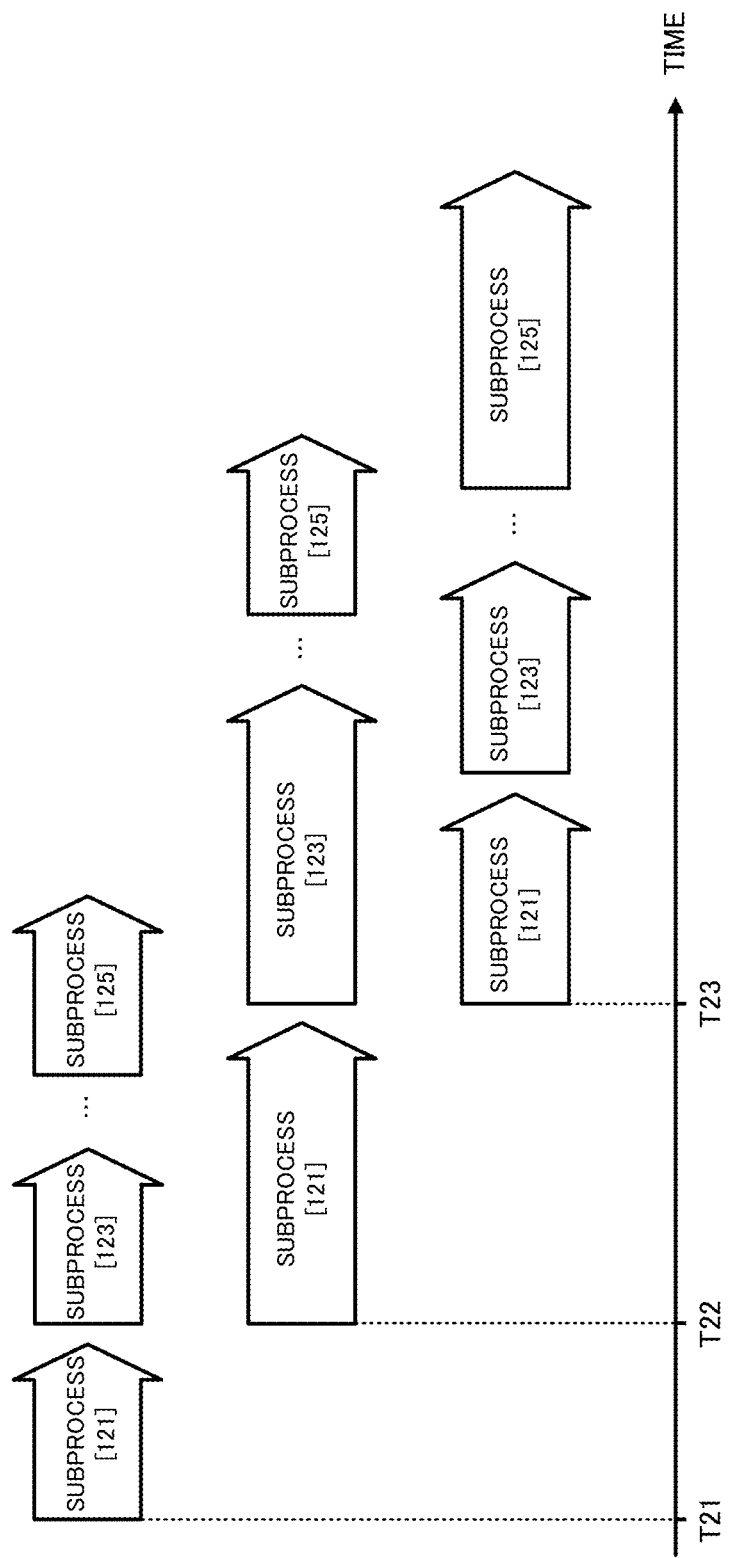
FIG. 5 is a diagram for explanation of iterative processing executed by a second processing unit according to the embodiment.

FIG. 5 schematically illustrates progress of iterative processing executed by the second processing unit 120. In FIG. 5, the numbers followed by the term "subprocess" each indicate a reference sign of a corresponding subprocessing unit of the subprocessing units 121, 123, and 125, as is in FIG. 4. As illustrated in FIG. 5, the length of time period for each of the subprocesses included in the batch processing changes with each execution and may be equal to or greater than the period T1 shown in FIG. 4, although equal to or less than the period T1 on average. Further, the "subprocess [121]" that is a first subprocess among the subprocesses executed by the second processing unit 120 may also be started aperiodically, as indicated by times T21, T22, and T23. In order to achieve higher design freedom and to enable processing freely selected by the user, the second processing unit 120 is preferably provided to operate on a general-purpose OS.

Again with reference to FIG. 3, the storage 102 functions as an interface buffer arranged at a boundary of the first processing unit 110 that executes the real-time processing and the second processing unit 120 that executes the batch processing. The storage 102, to stably execute the subsequent-stage batch processing repeatedly, has relatively large capacity. Specifically, the storage 102 has larger capacity than any buffers included in the first processing unit 110 and the second processing unit 120. The storage 102 has the capacity of, for example, 1 MB or 10 MB. However, this is not limiting, and any capacity may be employed. The storage 102 functions as the storage means in the claims.

The monitor 140 monitors an amount of data stored in the buffers of the first processing unit 110, in the buffers the second processing unit 120, and in the storage 102. When the buffers and the storage 102 store a large amount of data and have little free space, overflow of data from the buffers and the storage 102 occurs, so that the first processing unit 110 and the second processing unit 120 fail to execute the iterative processing normally. Thus the monitor 140 monitors the amount of data, thereby monitoring whether the processing by the first processing unit 110 or the processing by the second processing unit 120 is in an abnormal state. The monitor 140 includes: a first monitor 141 that monitors, for each of the buffers 112 and 114 that are included in the first processing unit 110, an amount of data stored in the corresponding buffer; a second monitor 142 that monitors a total amount of data stored in the buffers 122 and 124 of the second processing unit 120 and data stored in the storage 102, and a determiner 143 that determines, based on information output from the first monitor 141 and the second monitor 142, whether at least one of the processing by the first processing unit 110 or the processing by the second processing unit 120 is in an abnormal state. The monitor 140 functions as the monitor means in the claims.

The amounts of data that are monitoring targets of the monitor 140 may be amounts of data in bits or bytes stored in the buffers, filling rates with respect to the capacities of the buffers, amounts of free space in the buffers in bits or bytes, percentages of free space with respect to the capacities of the buffers, or other indicators relating to the amounts of data. The amounts of data that are the monitoring targets may be any indicators indicating statuses of processing according to the amounts of data stored in the buffers.

Figure 6:
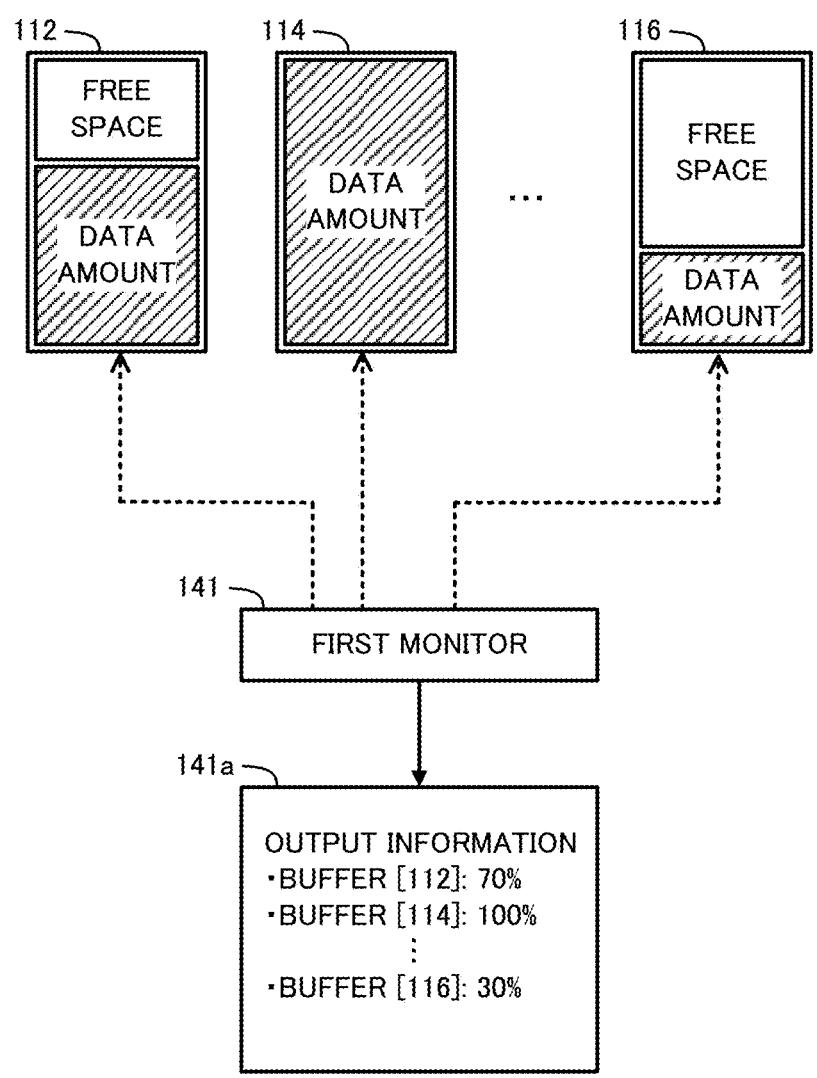
FIG. 6 is a diagram for explanation of a first monitor according to the embodiment.

The first monitor 141 refers to the buffers 112 and 114 of the first processing unit 110 and outputs, as a result of the monitoring, information relating to an amount of data stored in each of the buffers. Specifically, the first monitor 141 outputs output information 141a indicating the amount of data stored in each of the buffers, as illustrated in the example of FIG. 6. FIG. 6 illustrates a case where the first processing unit 110 includes a buffer 116, in addition to the buffers 112 and 114. The first monitor 141 functions as the first monitor means in the claims.

When the amount of data stored in the buffer 114 occupies 100% of the capacity of the buffer 114 as illustrated in FIG. 6, a result of the preceding-stage subprocess of the buffer 114 cannot be stored in the buffer 114. Additionally, when the amount of data stored in one of the other buffers occupies a large portion of the capacity of the one buffer, a result of a subprocess cannot be stored in the one buffer. Existence of a buffer in which the amount of data stored therein accounts for a relatively large percentage of the capacity of the buffer precludes periodic execution of the preceding-stage subprocess, causing an abnormality in overall processing by the first processing unit 110. Thus the first monitor 141 outputs, as a result of the monitoring, output information 141a that indicates, for each buffer, an amount of data stored in the corresponding buffer.

Figure 7:
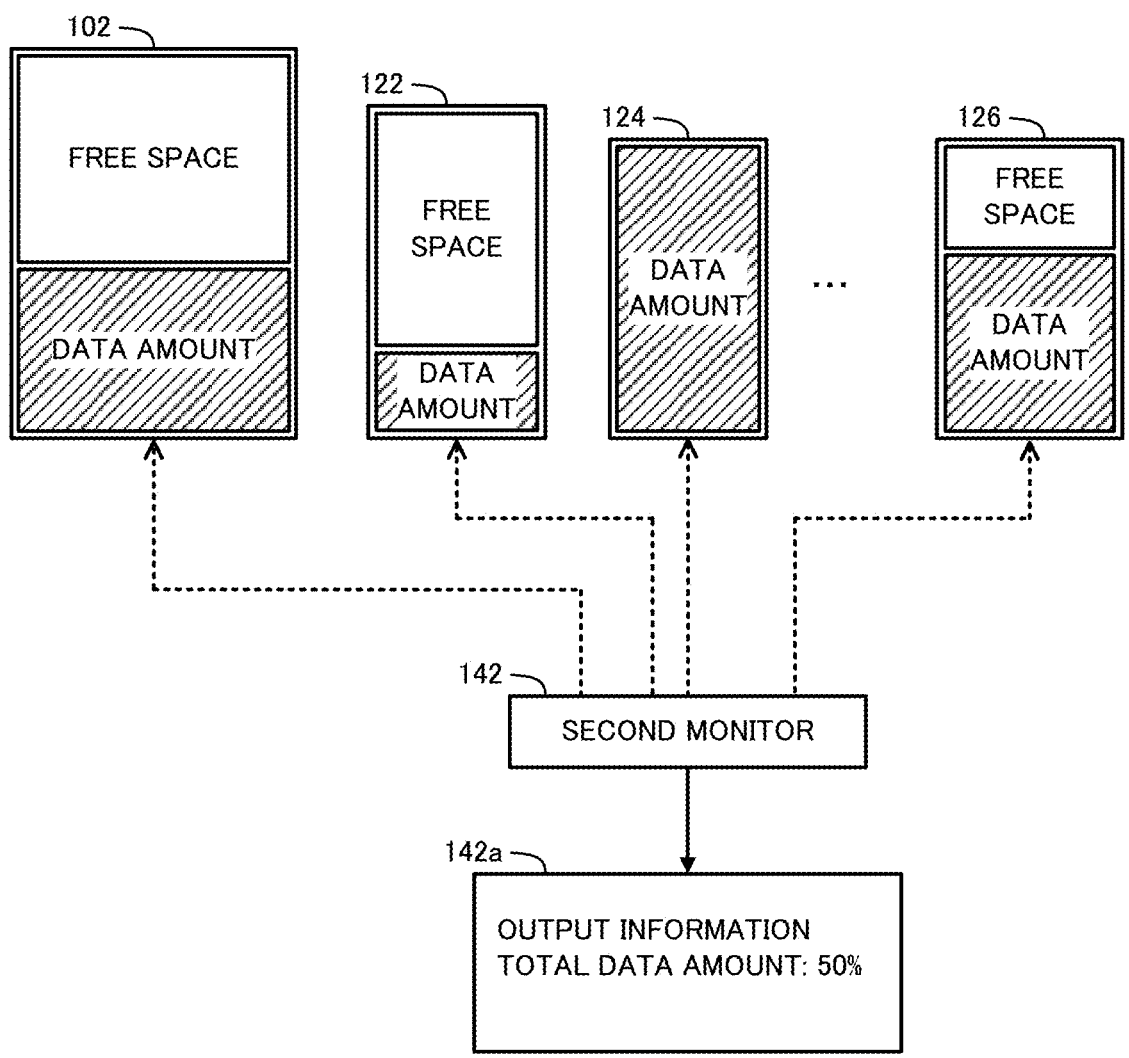
FIG. 7 is a diagram for explanation of a second monitor according to the embodiment.

Again with reference to FIG. 3, the second monitor 142 refers to the buffers 122 and 124 of the second processing unit 120 and to the storage 102, and outputs information relating to a total amount of data stored in these buffers and the storage 102. Specifically, the second monitor 142 calculates a total amount of data stored in these buffers and the storage 102, and outputs output information 142a indicating the calculated total amount of data, as illustrated in the example of FIG. 7. FIG. 7 illustrates a case where the second processing unit 120 includes a buffer 126, in addition to the buffers 122 and 124. The second monitor 142 functions as the second monitor means in the claims.

Here, even in the case where the amount of data stored in the buffer 124 occupies 100% of the capacity of the buffer 124 as illustrated in FIG. 7, execution of the processing by the second processing unit 120 is not severely affected by causing execution of the preceding-stage subprocess of the buffer 124 to wait temporarily. Further, even in the case where multiple buffers store data that amounts to 100% of the capacities of the buffers, execution of the processing by the second processing unit 120 is not severely affected by temporarily stopping execution of each preceding-stage subprocess of a corresponding buffer of the multiple buffers. However, in the case where the total amount of data stored in overall, including the storage 102 and the buffers of the second processing unit 120, accounts for a relatively large percentage of the overall capacity, dealing with this case is difficult only by temporarily stopping execution of any one of the subprocesses, and an abnormality occurs in overall processing by the second processing unit 120. Thus the second monitor 142 outputs, as a result of the monitoring, output information 142a that indicates the total amount of data.

Although FIGS. 6 and 7 illustrate examples of indicating percentages of data amounts with respect to the capacities, such configuration is not limiting. The information relating to the amounts of data may be the capacities and the amounts of data in bits or bytes, fractions of free space, or may be indicated by other expressions.

Again with reference to FIG. 3, the determiner 143 determines, based on the output information 141a and 142a, whether the buffers of the first processing unit 110, the buffers of the second processing unit 120, and the storage 102 are in a state that enables normal execution of the processing by the first processing unit 110 and the processing by the second processing unit 120. Specifically, the determiner 143, by determining whether one or more of the buffers of the first processing unit 110 store data exceeding a predetermined standard, determines whether the processing by the first processing unit 110 is in an abnormal state. Further, the determiner 143, by determining whether the total amount of data stored in the buffers of the second processing unit 120 and the storage 102 exceeds a predetermined standard, determines whether the processing by the second processing unit 120 is in an abnormal state. The determiner 143 functions as the determination means in the claims.

The controller 150 controls, based on a result of the determination by the determiner 143, the operations of the subprocessing units 111, 113, and 115. Specifically, the controller 150 collectively adjusts the periods for execution of the processing by the subprocessing units 111, 113, 115. More specifically, the controller 150, when the determiner 143 determines that at least one of the processing by the first processing unit 110 or the processing by the second processing unit 120 is in an abnormal state, controls the subprocessing units 111, 113, and 115 to change the periods for execution of the processing by the subprocessing units 111, 113, and 115 to periods longer than current periods. Lengthening these periods enables avoidance of data overflow from the buffers and the storage 102. The controller 150 functions as the control means in the claims.

The error manager 160 manages error information that is a result of determination by the determiner 143 that an abnormality occurs. Specifically, the error manager 160 accumulates the error information and provides the accumulated error information in response to a request from the exterior. Further, the error manager 160 includes a notifier 161 that sends notification of the error information to the user.

The notifier 161 receives a setting relating to notification to the user of a result of the determination by the determiner 143, and sends notification of the result of the determination in accordance with the received setting. The notifier 161 receives a setting of, for example, to-be-monitored buffers, a notification timing, a method for providing notification (such as "Pop-Up on a screen" or "storage destination of a file"), or other settings. The notifier 161 functions as the notification means in the claims.

Figure 8:
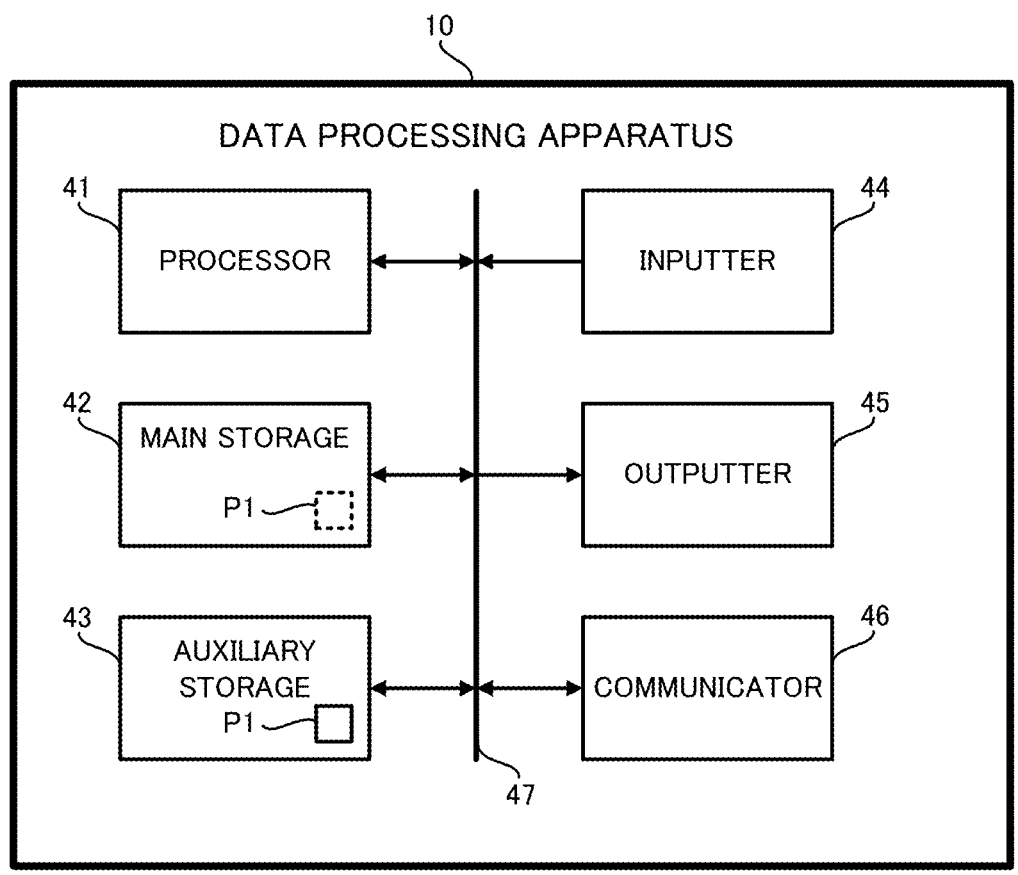
FIG. 8 illustrates hardware configuration of the data processing apparatus according to the embodiment.
Figure 9:
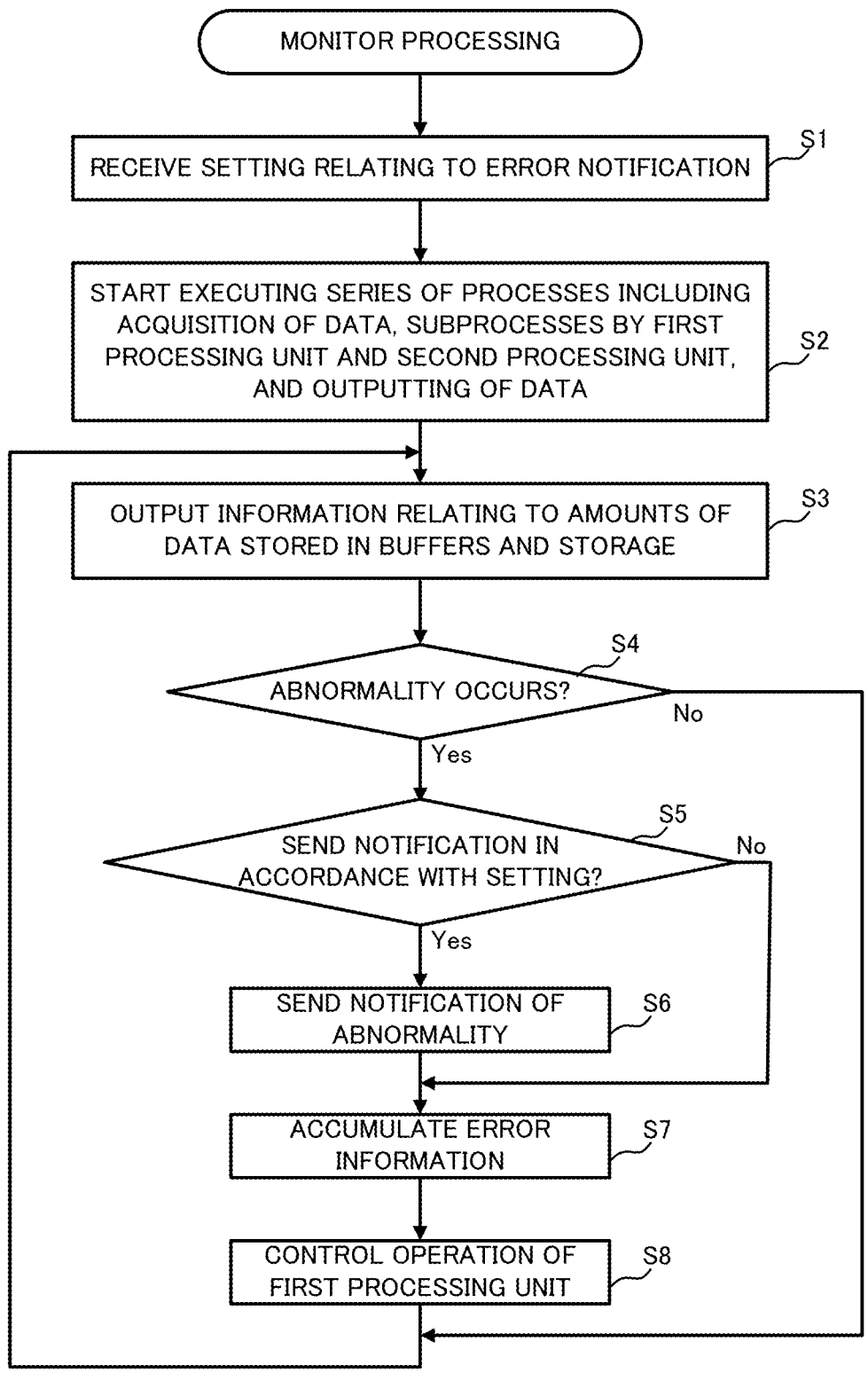
FIG. 9 is a flowchart illustrating monitor processing according to the embodiment.

Next, hardware configuration of the data processing apparatus 10 is described. As illustrated in FIG. 8, the data processing apparatus 10 includes a processor 41, a main storage 42, an auxiliary storage 43, an inputter 44, an outputter 45, and a communicator 46. The main storage 42, the auxiliary storage 43, the inputter 44, the outputter 45, and the communicator 46 are each connected to the processor 41 via an internal bus 47.

The processor 41 includes a central processing unit (CPU). The processor 41 executes a program P1 stored in the auxiliary storage 43 to achieve various functions of the data processing apparatus 10, thereby executing processing described later.

The main storage 42 includes random access memory (RAM). The program P1 is loaded from the auxiliary storage 43 into the main storage 42. The main storage 42 is used by the processor 41 as a work area.

The auxiliary storage 43 includes a nonvolatile memory such as an electrically erasable programmable read-only memory (EEPROM) and a hard disk drive (HDD). The auxiliary storage 43 stores the program P1 and various types of data used for processing by the processor 41. The auxiliary storage 43 supplies, in accordance with instructions from the processor 41, to the processor 41 data to be used by the processor 41 and stores data supplied from the processor 41.

The inputter 44 includes an input device such as input keys and a pointing device. The inputter 44 acquires information input by the user of the data processing apparatus 10 and sends notification of the acquired information to the processor 41.

The outputter 45 includes an output device such as a liquid crystal display (LCD) and a speaker. The outputter 45 presents various types of information to the user in accordance with instructions from the processor 41.

The communicator 46 includes a network interface circuit for communicating with an external device. The communicator 46 receives a signal from the exterior and outputs data indicated by the signal to the processor 41. Further, the communicator 46 transmits to the external device a signal indicating data output from the processor 41.

The hardware components illustrated in FIG. 8 cooperate with one another, thereby achieving various types of functions as illustrated in FIG. 3. Specifically, the acquirer 101 and the outputter 130 are mainly achieved by the communicator 46. The subprocessing units 111, 113, 115, 121, 123, and 125, the monitor 140 and the controller 150 are mainly achieved by the processor 41. The buffers 112, 114, 122, and 124 are mainly achieved by the main storage 42. The storage 102 is mainly achieved by the auxiliary storage 43. The error manager 160 is mainly achieved by the processor 41, the auxiliary storage 43, the inputter 44, and the outputter 45. However, this configuration is not limiting, and may be changed to any hardware configuration that achieves the functions illustrated in FIG. 3.

Next, a flow of monitor processing executed by the data processing apparatus 10 is described with reference to FIGS. 9-14. The monitor processing is processing of executing processing as illustrated in FIG. 2 with respect to data while monitoring whether an abnormality occurs during the processing.

In the monitor processing, the data processing apparatus 10 receives the setting relating to error notification (step S1). Specifically, the notifier 161 displays a screen prompting inputting of the setting and receives the setting input by the user. FIG. 10 illustrates an example of the setting. According to the example setting illustrated in FIG. 10, notifications of abnormalities in the buffers 112 and 116 included in the first processing unit 110 are sent, whereas notification of an abnormality in the buffer 114 included in the first processing unit 110 and notification of an abnormality in the second processing unit 120 are not sent.

Again with reference to FIG. 9, following step S1, the data processing apparatus 10 starts executing a series of processes including acquisition of data, subprocesses by the first processing unit 110 and the second processing unit 120, and outputting of data (step S2). Specifically, the acquirer 101 starts periodic acquiring of data. This starts the iterative processing of data executed by the first processing unit 110, the second processing unit 120, and the outputter 130.

Here, the subprocesses executed by the subprocessing units 111, 113, and 115 of the first processing unit 110 and the subprocesses executed by the subprocessing units 121, 123, and 125 of the second processing unit 120 are described in turn.

Figure 11:
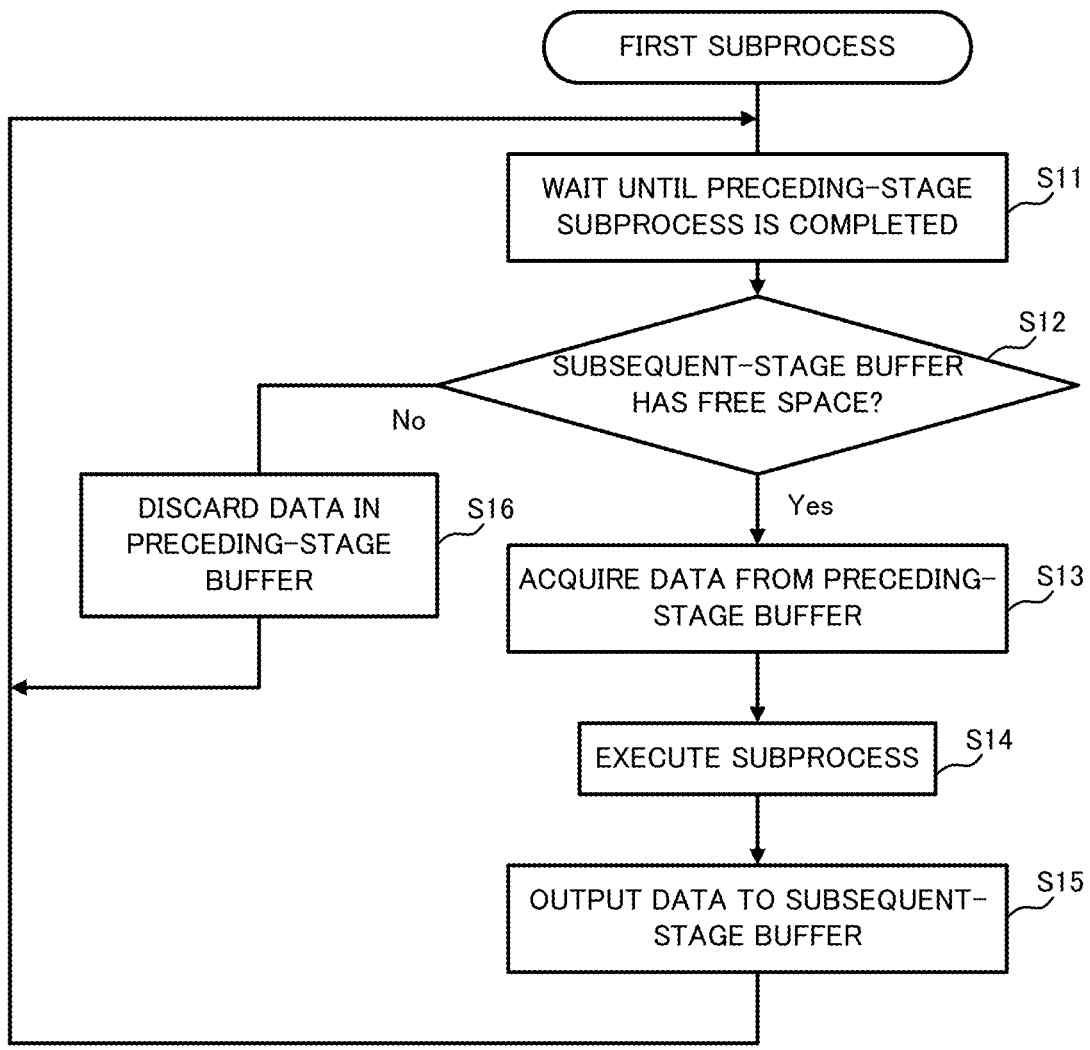
FIG. 11 is a flowchart illustrating a first subprocess according to the embodiment.

FIG. 11 illustrates a first subprocess that is the subprocess executed by each of the subprocessing units 111, 113, and 115. Hereinafter, the first subprocess is described mainly in the case where an executor of the first subprocess is the subprocessing unit 113.

In the first subprocess, the subprocessing unit 113 waits until the preceding-stage subprocess is completed (step S11). Specifically, the subprocessing unit 113 waits until the data that is a result of the subprocess by the subprocessing unit 111 is stored in the preceding-stage buffer 112. When the executor of the first subprocess is the subprocessing unit 111, the "preceding-stage subprocess" in step S11 corresponds to the acquiring of data by the acquirer 101. In this case, the subprocessing unit 111, in step S11, waits until data is output from the acquirer 101.

Then the subprocessing unit 113 determines whether the subsequent-stage buffer has free space (step S12). Specifically, the subprocessing unit 113 checks whether the subsequent-stage buffer 114 has free space available for storing data that is a result of the processing. In the case where the executor of the first subprocess is the subprocessing unit 115, the "subsequent-stage buffer" in step S12 corresponds to the storage 102.

When a determination is made in step S12 that the subsequent-stage buffer has free space (YES in step S12), the subprocessing unit 113 acquires data from the preceding-stage buffer (step S13). Specifically, the subprocessing unit 113 reads, among the data stored in the preceding-stage buffer 112, data to be subjected to one iteration of the subprocess by the subprocessing unit 113.

Then the subprocessing unit 113 executes the subprocess (step S14). Specifically, the subprocessing unit 113 executes the subprocess with respect to the data acquired in step S13.

Then the subprocessing unit 113 outputs data to the subsequent-stage buffer (step S15). Specifically, the subprocessing unit 113 stores in the buffer 114 data indicating a result of the processing. In the case where the executor of the first subprocess is the subprocessing unit 115, the "subsequent-stage buffer" in step S15 corresponds to the storage 102. Thereafter, the subprocessing unit 113 repeats the processing in step S11 and beyond.

When a determination is made in step S12 that the subsequent-stage buffer has no free space (NO in step S12), the subprocessing unit 113 reads the data from the preceding-stage buffer and discards the data (step S16). Thereafter, the subprocessing unit 113 repeats the processing in step S11 and beyond. Although the first processing unit 110 malfunctions with respect to the stream data processing of the discarded data, such configuration enables continuation of the processing by the first processing unit 110 with respect to subsequent data.

Each of the subprocessing units 111, 113, and 115 executes the first subprocess as illustrated in FIG. 11, and thus each of the subprocessing units 111, 113, and 115 can repeatedly execute the subprocess simply by referring to the preceding-stage buffer and the subsequent-stage buffer, without communicating and synchronizing with the other subprocessing units. Further, a period that is longer than a period for execution of a series of processes from step S11 to step S16 one time is set as the period T1 for a data acquisition executed by the acquirer 101. Thus, each of the subprocessing units 111, 113, and 115 executes the iterative processing in a period equivalent to the period T1.

Figure 12:
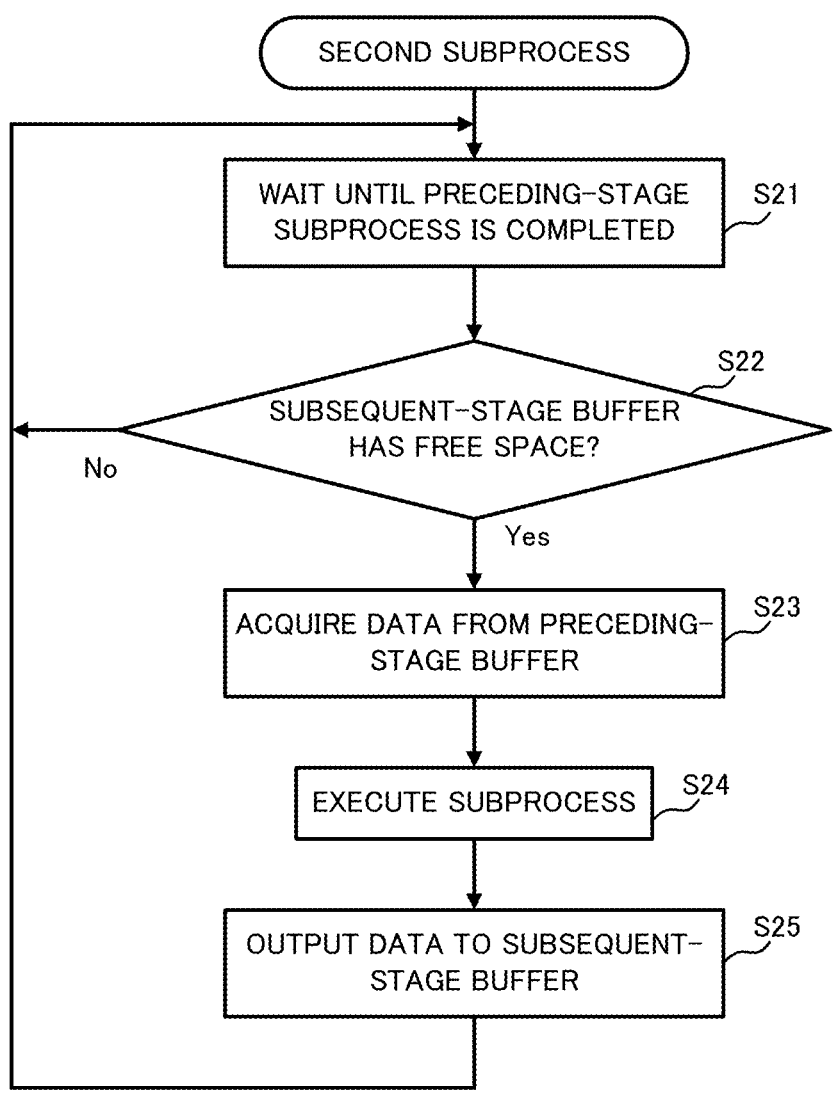
FIG. 12 is a flowchart illustrating a second subprocess according to the embodiment.

Next, a second subprocess that is the subprocess executed by each of the subprocessing units 121, 123, and 125 is described with reference to FIG. 12. In the second subprocess, steps S21-S25 that are equivalent to steps S11-S15 illustrated in FIG. 11 are executed, as illustrated in FIG. 12. Hereinafter, the second subprocessing is described mainly in the case where an executor of the second subprocess is the subprocessing unit 123.

In the second subprocess, the subprocessing unit 123 waits until the preceding-stage subprocess is completed (step S21). Specifically, the subprocessing unit 123 waits until the data that is a result of the subprocess by the subprocessing unit 121 is stored in the preceding-stage buffer 122. When the executor of the second subprocess is the subprocessing unit 121, the "preceding-stage subprocess" in step S21 corresponds to the processing by the first processing unit 110. In this case, the subprocessing unit 121, in step S21, waits until data of the processing result is stored in the storage 102.

Then the subprocessing unit 123 determines whether the subsequent-stage buffer has free space (step S22). Specifically, the subprocessing unit 123 checks whether the subsequent-stage buffer 124 has free space available for storing data that is a result of the processing. In the case where the executor of the second subprocess is the subprocessing unit 125, step S22 may be omitted.

When a determination is made in step S22 that the subsequent-stage buffer has free space (YES in step S22), the subprocessing unit 123 acquires data from the preceding-stage buffer (step S23). Specifically, the subprocessing unit 123 reads, among the data stored in the preceding-stage buffer 122, data to be subjected to one iteration of the subprocess by the subprocessing unit 123.

Then the subprocessing unit 123 executes the subprocess (step S24). Specifically, the subprocessing unit 123 executes the subprocess with respect to the data acquired in step S23.

Then the subprocessing unit 123 outputs data to the subsequent-stage buffer (step S25). Specifically, the subprocessing unit 123 stores in the buffer 124 data indicating a result of the processing. In the case where the executor of the first subprocess is the subprocessing unit 125, the "subsequent-stage buffer" in step S25 corresponds to the outputter 130. Thereafter, the subprocessing unit 123 repeats the processing in step S21 and beyond.

When a determination is made in step S22 that the subsequent-stage buffer has no free space (NO in step S22), the subprocessing unit 123 shifts the processing to step S21 without executing the subprocess. Thus, execution of the subprocess is suspended until the determination is made that the subsequent-stage buffer has free space.

Each of the subprocessing units 121, 123, and 125 executes the second subprocess as illustrated in FIG. 12, and thus each of the subprocessing units 121, 123, and 125 can repeatedly execute the subprocess merely by referring to the preceding-stage buffer and the subsequent-stage buffer, without communicating with the other subprocessing units. Further, in the second subprocess, discarding of data for ensuring real-timeliness is not performed and execution of the subprocess is suspended until the subsequent-stage buffer has free space. This enables higher design freedom and allows the user to design various types of subprocesses.

Again with reference to FIG. 9, following step S2, the data processing apparatus 10 outputs information relating to the amounts of data stored in the buffers of the first processing unit 110 and to the amount of data stored in the buffers of the second processing unit 120 and the storage 102 (step S3). Specifically, the first monitor 141 and the second monitor 142 output the output information.

Then the data processing apparatus 10 determines, based on the information that is output in step S3, whether an abnormality occurs (step S4). Specifically, the determiner 143 determines, based on the output information, whether an abnormality occurs in the buffers or the storage 102. FIG. 13 illustrates an example of abnormality determination conditions that are used by the determiner 143 to determine whether an abnormality occurs. According to the example of FIG. 13, the determination is made for each of the buffers 112, 114, and 116 that an abnormality occurs when the amount of data stored in the corresponding buffer exceeds a threshold value of 70%, and the determination that an abnormality occurs is made when the total amount of data stored in the buffers of the second processing unit 120 and the storage 102 exceeds a threshold value of 50%. These threshold values may be fixed, or may be modified by the user.

Again with reference to FIG. 9, when a determination is made in step S4 that no abnormality occurs (NO in step S4), the data processing apparatus 10 repeats the processing in step S3 and beyond. Conversely, when a determination is made in step S4 that an abnormality occurs (YES in step S4), the data processing apparatus 10 determines, in accordance with the setting, whether to send notification (step S5). Specifically, the notifier 161 determines, in accordance with content of the setting received in step S1, whether to send, to the user, notification of content of the abnormality that is determined to occur in step S4.

When a determination is made that notification of an abnormality is not to be sent (NO in step S5), the data processing apparatus 10 shifts the processing to step S7. Conversely, when a determination is made that notification of an abnormality is to be sent (YES in step S5), the data processing apparatus 10 send notification of the abnormality to the user (Step S6). This allows the user to recognize occurrence of an abnormality and to address the abnormality appropriately Then the data processing apparatus 10 accumulates the error information (step S7). Specifically, the error manager 160 accumulates content of the abnormality determined in step S4 to occur. FIG. 14 illustrates an example table of an abnormality occurrence history indicating the error information accumulated by the error manager 160. The error manager 160, every time a determination is made in step S4 that an abnormality occurs, appends content of the abnormality to this table.

Then the data processing apparatus 10 controls the operation of the first processing unit 110 (step S8). Specifically, the controller 150, by decreasing a transmission frequency of data from the acquirer 101 to the first processing unit 110 to a predetermined value, decreases execution speed of the subprocessing units 111, 113, and 115. This control may be performed for a set duration of a predetermined length and may be stopped after the set duration. The length of the duration is, for example, one minute.

Thereafter, the data processing apparatus 10 repeats the processing in step S3 and beyond. Thus, when an abnormality occurs, processing speed of the first processing unit 110 decreases and the amount of data stored in each buffer of the first processing unit 110 decreases, starting in order from the buffer 112. In this case, a speed of writing new data to the storage 102 decreases, and then the amount of data stored in each buffer of the second processing unit 120 decreases. As a result, both the amount of data stored in the buffers of the first processing unit 110 and the amount of data stored in the buffers of the second processing unit 120 and in the storage 102 decrease, and the abnormal state is eliminated.

As described above, the data processing apparatus 10 monitors, for the first processing unit 110 that is the preceding-stage processing unit, the amount of data stored in the buffer 112 and the amount of data stored in the buffer 114, and for the second processing unit 120 that is the subsequent-stage processing unit, the total amount of data stored in the buffers 122 and 124 and data stored in the storage 102. Thus information that matches the characteristics of both the processing units can be provided to the user, and the user can grasp a status of processing by the first processing means and a status of processing by the second processing means, and can utilize the statuses to review a processing setting.

Furthermore, the data processing apparatus 10 outputs, for the first processing unit 110 that is the preceding-stage processing unit, information relating to the amount of data stored in the buffer 112 and to the amount of data stored in the buffer 114, and outputs, for the second processing unit 120 that is the subsequent-stage processing unit, the total amount of data stored in the buffers 122 and 124. Although focusing on the amount of data stored in each buffer is not required for the second processing unit 120, the progress of processing is affected when the total amount of data stored in the second processing unit 120 increases to some degree. Thus, information relating to the total amount of data can be said to be information that appropriately indicates a status of data processing, and accordingly, a monitoring result that indicates a status of data processing appropriately can be obtained.

Furthermore, the data processing apparatus includes the storage 102 that serves as an interface buffer arranged between the first processing unit 110 and the second processing unit 120, and the second monitor 142 outputs information relating to the total amount of data stored in the buffers 122 and 124 of the second processing unit 120 and data stored in the storage 102. This enables smooth connection between the processing by the first processing unit 110 and the processing by the second processing unit 120. Further, the processing by the second processing unit 120 is affected when an amount of data stored in the storage 102 increases to some degree, and thus the information output from the second monitor 142 can be utilized as information indicating a status of the processing by the second processing unit 120 appropriately.

Furthermore, the storage 102 has larger capacity than any of the buffers included in the first processing unit 110 and the second processing unit 120. This allows the second processing unit 120 to execute a greater variety of types of subprocesses than the first processing unit 110.

Furthermore, the monitor 140 includes the determiner 143 that determines whether the processing by the first processing unit 110 or the processing by the second processing unit 120 is in an abnormal state. This allows the data processing apparatus 10 to determine whether an abnormality in processing occurs.

Furthermore, the data processing apparatus 10 includes the notifier 161 that receives the setting relating to notification of a determination result and sends notification of the determination result in accordance with the setting. Thus, by performing the setting beforehand, the user can enable, only in cases desired by the user, sending of the notification of a result of determination that an abnormality occurs.

Furthermore, the data processing apparatus 10 includes the controller 150 that controls an operation of the first processing unit 110. This enables eliminating of an abnormal state according to statuses of the buffers and the storage 102 and maintaining execution of the data processing by the data processing apparatus 10.

Although an embodiment of the present disclosure is described above, the present disclosure is not limited with the above-described embodiment.

For example, although the data processing apparatus 10 collects data from a production line and outputs data to the device 22 arranged on the production line, this configuration is not limiting. The data processing executed by the data processing apparatus 10 may be applied to a manufacturing system, a machining system, or an inspection system, or may be applied to facilities other than a factory. For example, a plant, an office, and a public facility are conceivable as the facilities other than the factory. Further, the data processing apparatus 10 may be suitably used for a moving object such as a vehicle, an aircraft, and a ship.

Furthermore, although the acquirer 101 repeatedly acquires data via the network 20 in the above-described embodiment, this configuration is not limiting. The acquirer 101 may acquire data via a dedicated line. Further, the acquirer 101 may acquire data by reading data from an external storage device or from the auxiliary storage 43. Moreover, the acquirer 101 may acquire data using other methods.

Furthermore, although the outputter 130 outputs a control instruction via the network 20 in the above-described embodiment, this configuration is not limiting. The outputter 130 may output data via a dedicated line. Moreover, the data output from the outputter 130 may be utilized for a use different from control of the device 22. For example, the data may be accumulated as product management information or quality management information, or may be sent to a user as notification information indicating operation status of a production line.

Figure 15:
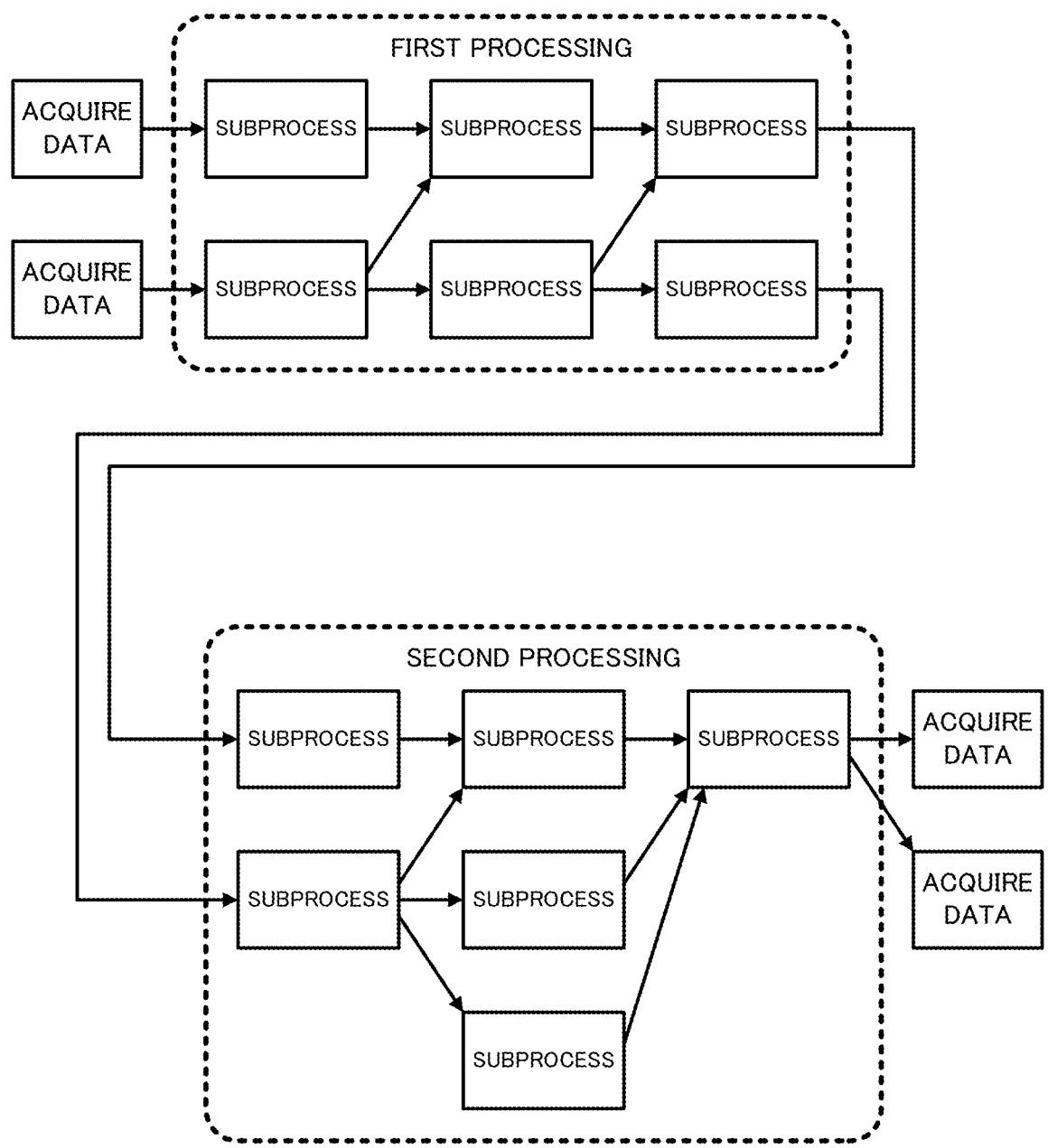
FIG. 15 is a first diagram schematically illustrating a flow of data processing according to a modified example.

Furthermore, although handling of execution of a relatively simple process flow, as illustrated in FIG. 2, is described in the above-described embodiment, this configuration is not limiting. The process flow may include, as illustrated in the example of FIG. 15, a divergent pathway for transmission of data from one subprocess to multiple subprocesses, and a convergent pathway for transmission of data from multiple subprocesses to one subprocess.

Figure 16:
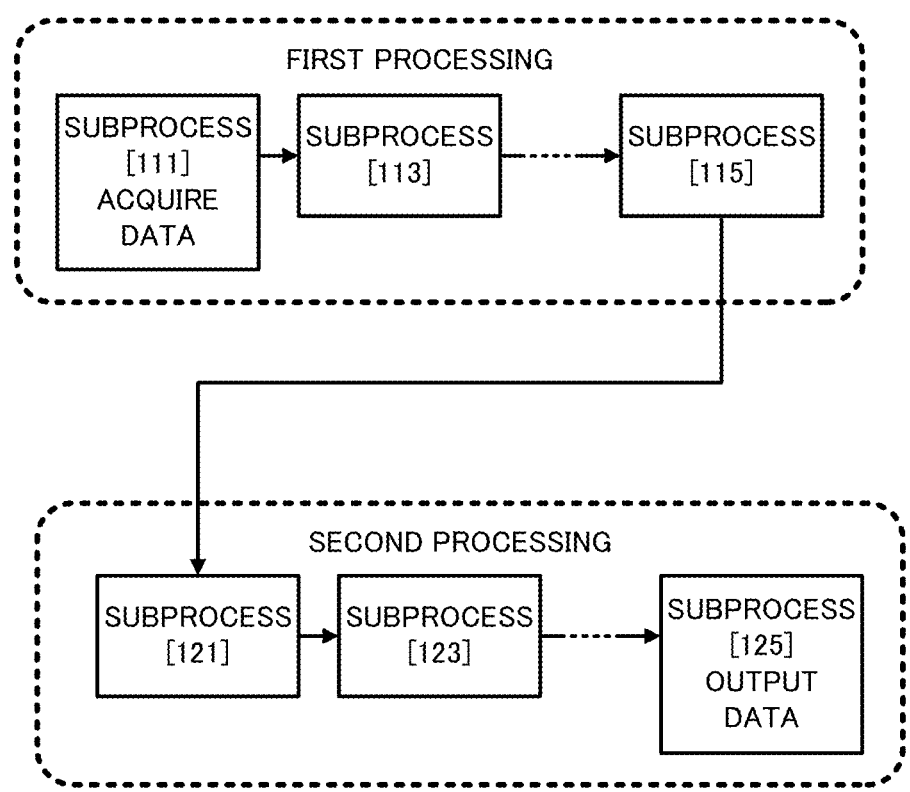
FIG. 16 is a second diagram schematically illustrating a flow of data processing according to a modified example.

Furthermore, although the processing of acquiring data from the exterior and the first processing are treated as separated and the second processing and the processing of outputting data to the exterior are treated as separated, this configuration is not limiting. As illustrated in FIG. 16, the first processing may include a subprocess of acquiring data from the exterior, and the second processing may include a subprocess of outputting data to the exterior.

Figure 17:
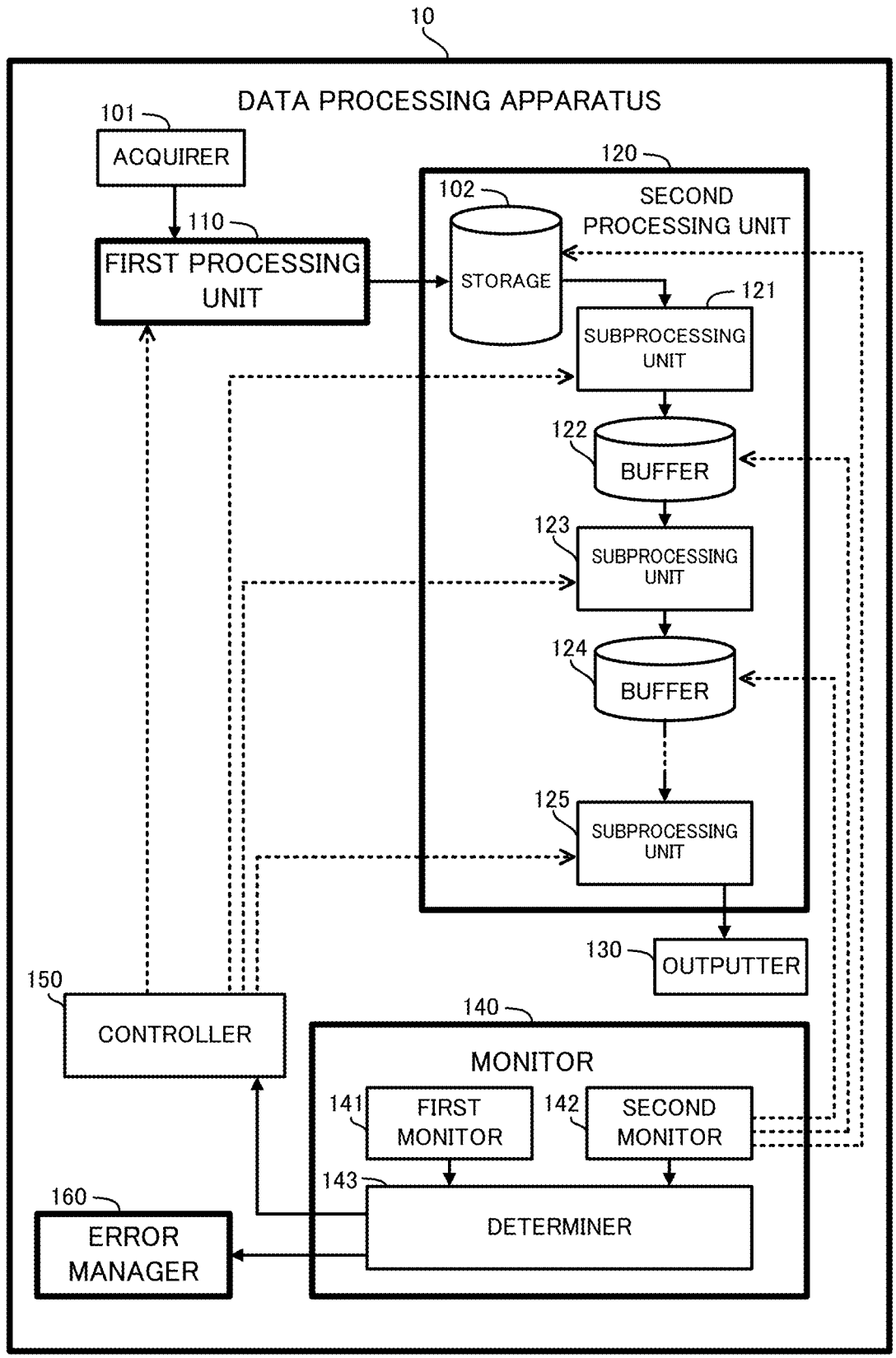
FIG. 17 is a first diagram illustrating functional configuration of a data processing apparatus according to a modified example.

Furthermore, although a control target of the controller 150 is limited to the first processing unit 110 in the above-described embodiment, the controller 150 may control the subprocessing units 121, 123, and 125 that are included in the second processing unit 120, as illustrated in FIG. 17. Specifically, the controller 150 may cause one or more of the subprocessing units 121, 123, and 125 to stop execution of a subprocess temporarily. As the subprocessing units 121, 123, and 125 are not required to execute subprocesses in synchronization with one another, the controller 150 may control the subprocessing units 121, 123 and 125 non-collectively. Further, the controller 150 may control at least one of the operation of the first processing unit 110 or the operation of the second processing unit 120.

Figure 18:
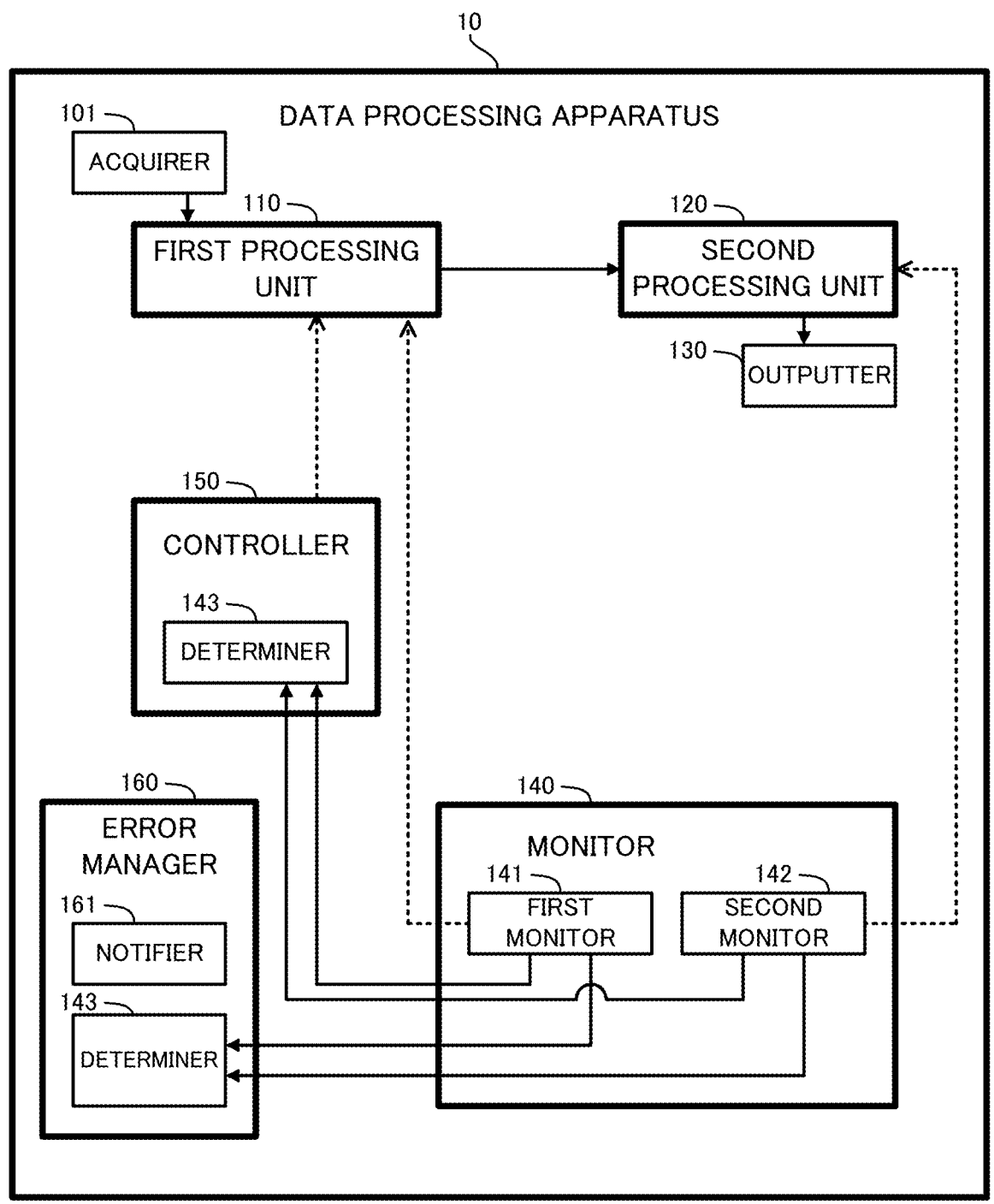
FIG. 18 is a second diagram illustrating functional configuration of a data processing apparatus according to a modified example.

Furthermore, although the monitor 140 includes the determiner 143 in the above-described embodiment, this configuration is not limiting. For example, a configuration may be employed in which each of the controller 150 and the notifier 161 includes the determiner 143 as illustrated in FIG. 18 and determination conditions employed by the determiner 143 of the controller 150 differ from determination conditions of the determiner 143 of the notifier 161. In the case where the notifier 161 includes the determiner 143, the setting received by the notifier 161 may include abnormality determination conditions employed by the determiner 143.

Figure 19:
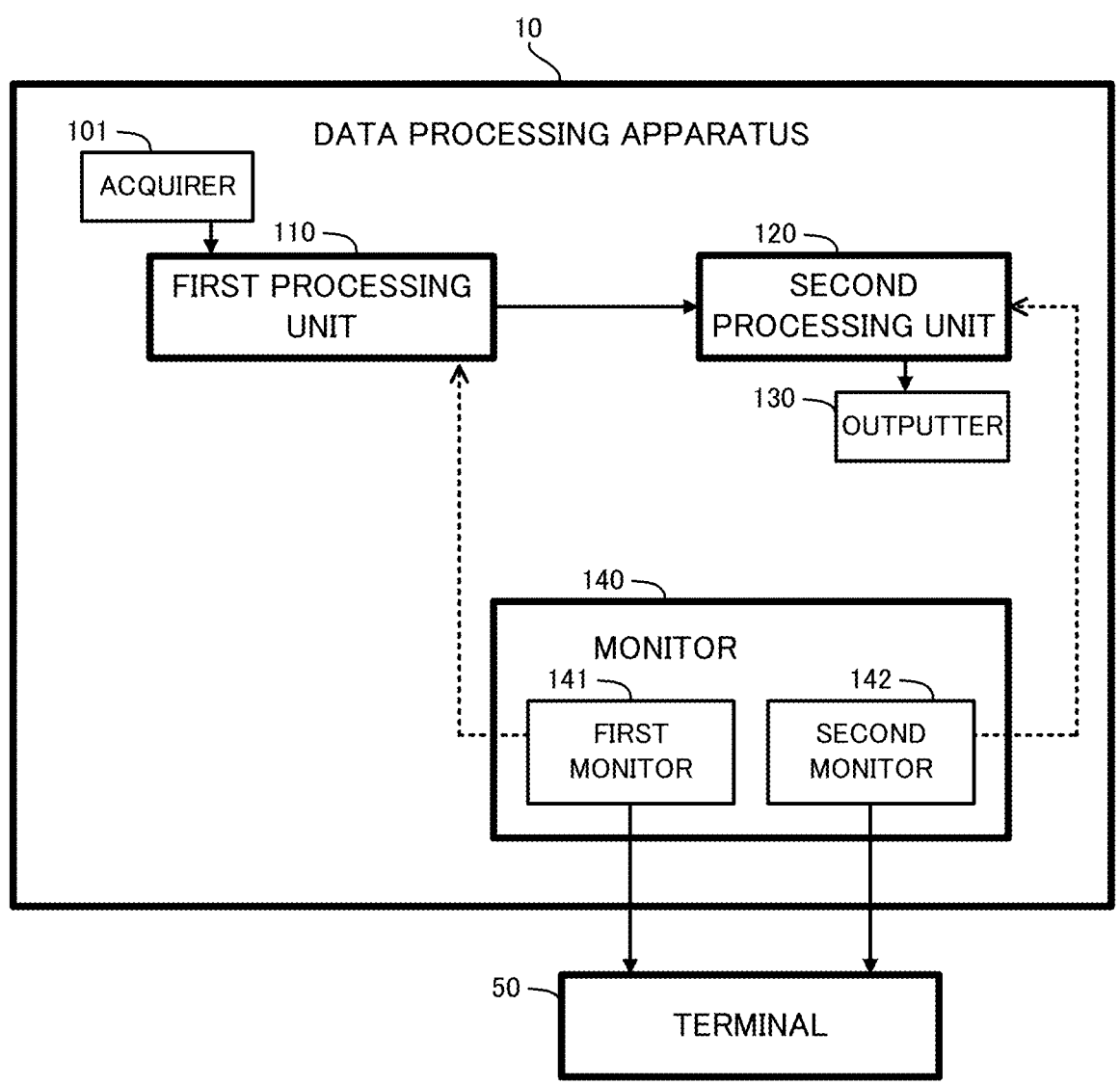
FIG. 19 is a third diagram illustrating functional configuration of a data processing apparatus according to a modified example.

Furthermore, an embodiment as illustrated in FIG. 19 is conceivable in which the first monitor 141 and the second monitor 142 output information directly to the exterior of the data processing apparatus 10. According to the example of FIG. 19, a terminal 50 displays, to the user, content of the output information 141a output from the first monitor 141 and content of the output information 142a output from the second monitor 142. The user may adjust, upon determination of whether the amounts of data stored in the buffers and the storage 102 are in an abnormal state, operations of the first processing unit 110 and the second processing unit 120 manually.

Figure 20:
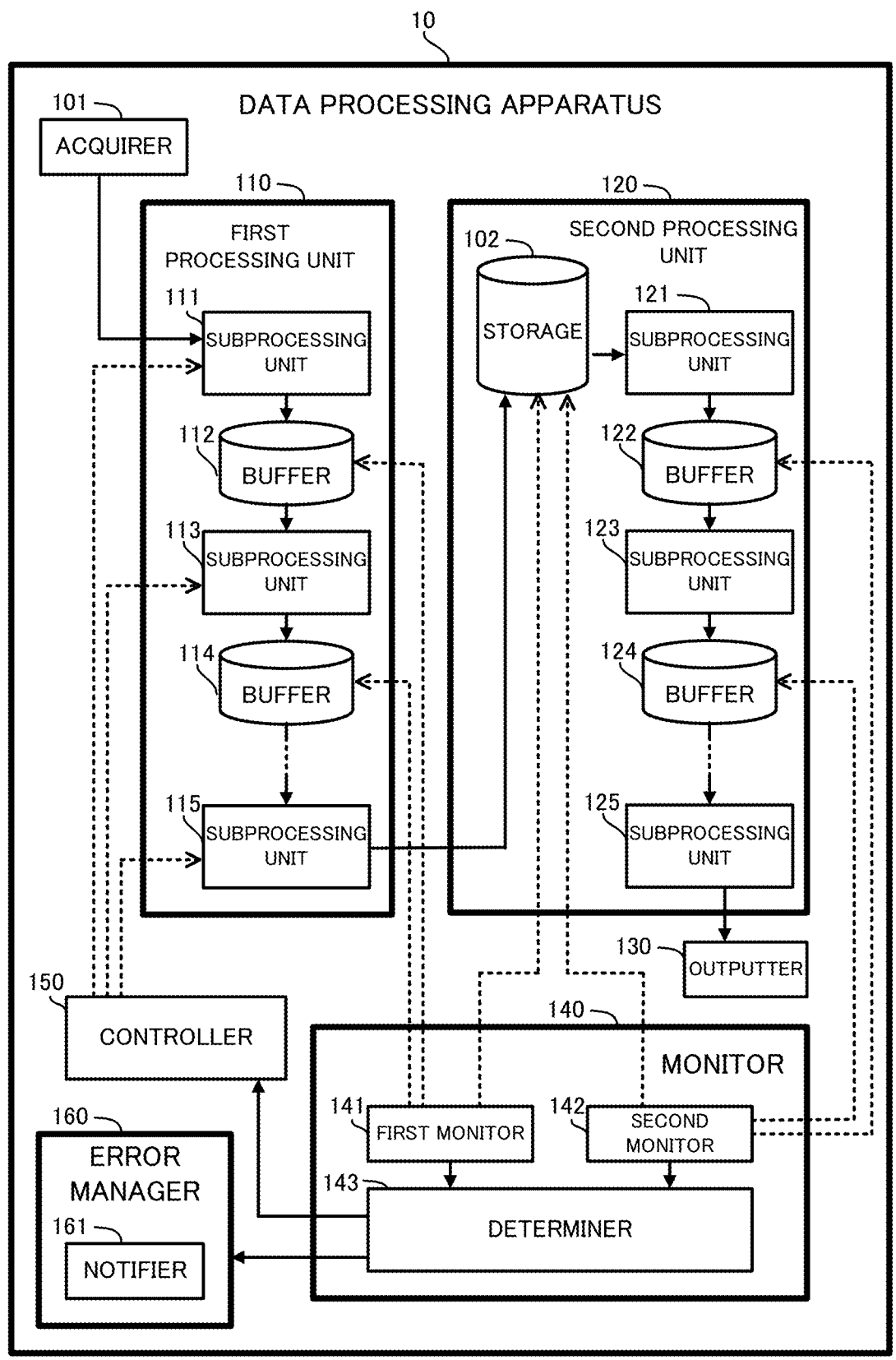
FIG. 20 is a fourth diagram illustrating functional configuration of a data processing apparatus according to a modified example.

Furthermore, although an example of monitoring the buffers 112 and 114 of the first processing unit 110 using the first monitor 141 is described in the above-described embodiment, the first monitor 141 may further monitor the amount of data stored in the storage 102, as illustrated in FIG. 20. As the amount of data stored in the storage 102 affects the processing by the first processing unit 110, a first monitor 141 that monitors the amount of data stored in the storage 102 enables obtaining a more appropriate result indicating the status of processing.

Furthermore, an embodiment in which the monitor 140 is provided as a device that is separate from the data processing apparatus 10 is conceivable. This embodiment requires the data processing apparatus 10 to have configuration for sending in nearly real time the amounts of data stored in the buffers of the first processing unit 110, the buffers of the second processing units 120, and the storage 102.

Furthermore, although the storage 102 according to the above-described embodiment is included in the second processing unit 120, the storage 102 may be arranged as an element separate from the first processing unit 110 and the second processing unit 120 or may be included in the first processing unit 110. Further, although the second monitor 142 according to the above-described embodiment does not monitor an amount of data for each of the buffers 122 and 124, the second monitor 142 may monitor an amount of data for each buffer.

Furthermore, the functions of the data processing apparatus 10 can be achieved by dedicated hardware or by a normal computer system.

For example, distributing the program P1 to be executed by the processor 41 by storing the program P1 in a non-transitory computer-readable recording medium and then installing the program P1 on a computer can achieve an apparatus for executing the above-described processing. A flexible disk, a compact disc read-only memory (CD-ROM), a digital versatile disc (DVD), and a magneto-optical (MO) disc are conceivable as examples of such a recording medium.

Furthermore, the program P1 may be stored in a disk device included in a server device on a communication network such as the Internet and may be downloaded onto a computer, for example, by superimposing the program P1 on a carrier wave.

Furthermore, the above-described processing can also be achieved by starting and executing the program P1 while transferring the program P1 through the communication network.

Furthermore, the above-described processing can also be achieved by executing all or a portion of the program P1 on the server device and by executing, using the computer, programming while transmitting and receiving information relating to the processing via the communication network.

In the case where the above-described functions are implemented by an operating system (OS) by allotment to the OS or are implemented by cooperation between the OS and an application, for example, storage and distribution on the medium of only portions of the program P1 other than a portion of the program P1 executed by the OS is permissible. Alternatively, such portions of the program P1 may be downloaded to a computer.

Furthermore, the means for achieving the functions of the data processing apparatus 10 is not limited to software, and a part of or all of the functions may be achieved by dedicated hardware including a circuit.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for data processing.

REFERENCE SIGNS LIST

100 Processing system
10 Data processing apparatus
101 Acquirer
102 Storage
110 First processing unit
111, 113, 115, 121, 123, 125 Subprocessing unit
112, 114, 116, 122, 124, 126 Buffer
120 Second processing unit
130 Outputter
140 Monitor
141 First monitor 141a, 142a Output information
142 Second monitor
143 Determiner
150 Controller
160 Error manager
161 Notifier
20 Network
21, 22 Device
300 Data processing
301 Data acquisition
310 First processing
311, 313, 315, 321, 323, 325 Subprocess
320 Second processing
330 Data output
41 Processor
42 Main storage
43 Auxiliary storage
44 Inputter
45 Outputter
46 Communicator
47 Internal bus
50 Terminal
P1 Program

The invention claimed is:

1. A data processing apparatus comprising:
first processing circuitry configured to execute real-time processing with respect to data that is collected periodically from a device on a production line of a factory;
second processing circuitry configured to execute batch processing aperiodically with respect to data that is output from the first processing circuitry as a result of processing by the first processing circuitry; and
a monitor to monitor a first status of the processing by the first processing circuitry and a second status of processing by the second processing circuitry, wherein
each of the first processing circuitry and the second processing circuitry, includes:
a plurality of subprocessing circuitries configured to execute subprocesses included in the processing executed with respect to data; and
buffers to store data output from the plurality of subprocessing circuitries, each of the buffers storing data output from a corresponding subprocessing circuitry,
the second processing circuitry further includes a storage to store the data output from the first processing circuitry and to provide the stored data to a first subprocessing circuitry of the plurality of subprocessing circuitries included in the second processing circuitry, the first subprocessing circuitry serving as a starting point,
the second processing circuitry, when an amount of data stored in a buffer of the buffers included in the second processing circuitry is equal to or larger than a threshold value, temporarily stops execution of a subprocess by a subprocessing circuitry of the subprocessing circuitries included in the second processing circuitry, the temporary stopping execution of the subprocess by the subprocessing circuitry stopping outputting of data to the buffer, and
the monitor includes:
a first monitor to monitor, for each of the buffers included in the first processing circuitry, an amount of the data stored in the corresponding buffer;
a second monitor to monitor a total amount of (i) the data stored in the buffers included in the second processing circuitry and (ii) the data stored in the storage of the second processing circuitry; and
a determiner to determine, based on a result of the monitoring by the first monitor and the second monitor, whether at least one of the processing by the first processing circuitry or the processing by the second processing circuitry is in a predetermined abnormal state.

2. The data processing apparatus according to claim 1, wherein the first monitor monitors the amount of the data stored in the storage.

3. The data processing apparatus according to claim 1, wherein the storage has larger capacity than any of the buffers included in the first processing circuitry and the second processing circuitry.

4. The data processing apparatus according to claim 1, further comprising:
a notifier to receive a setting relating to notification to a user of a result of the determination by the determiner and to send notification of the result of the determination in accordance with the received setting.

5. The data processing apparatus according to claim 1, further comprising:
a controller to control, based on a result of the monitoring by the first monitor and the second monitor, at least one of a first operation of the first processing circuitry or a second operation of the second processing circuitry.

6. The data processing apparatus according to claim 1, wherein at least some of the subprocesses of the first processing circuitry overlap in time, and
wherein at least some of the subprocesses of the second processing circuitry overlap in time.

7. The data processing apparatus according to claim 1, wherein length of time of some or all of the subprocesses per batch processing changes with respect to a prior batch processing and/or a subsequent batch processing.

8. The data processing apparatus according to claim 1, wherein when the determining determines that the second processing circuitry is in the predetermined abnormal state, a timing of the periodic collection of the data associated with the real-time processing of the first circuitry is increased.

9. A monitoring method comprising:
a. first monitoring step of monitoring amounts of buffering data buffered in a plurality of buffering processes of buffering data output from a plurality of subprocesses included in first processing of executing real-time processing with respect to data that is collected periodically from a device on a production line of a factory, each of the plurality of buffering processes including buffering data output from a corresponding subprocess of the plurality of subprocesses included in the first processing and each of the amounts of the buffering data being monitored for a corresponding buffering process of the plurality of buffering processes;
a second monitoring step of monitoring a total amount of buffering data buffered in a plurality of buffering processes of buffering data output from a plurality of subprocesses included in second processing of executing batch processing aperiodically with respect to data indicating a result of processing in the first processing, each of the plurality of buffering processes including buffering data output from a corresponding subprocess of the plurality of subprocesses included in the second processing;
a stopping step of, when an amount of buffering data buffered in a buffering process of the plurality of buffering processes included in the second processing is equal to or larger than a threshold value, temporarily stopping execution of a subprocess of the plurality of subprocesses included in the second processing, the temporary stopping execution of the subprocess including stopping outputting of data to be buffered in the buffering process; and a determination step of determining, based on a result of the monitoring in the first monitoring step and the second monitoring step, whether at least one of the processing in the first processing or processing in the second processing is in a predetermined abnormal state.

10. The monitoring method according to claim 9, further comprising changing length of time of some or all of subprocesses per the aperiodic batch processing with respect to a prior aperiodic batch processing and/or a subsequent aperiodic batch processing.

11. Monitoring method according to claim 9, wherein, when said determining determines that the at least one of the processing in the first processing or the processing in the second processing is in the predetermined abnormal state, increasing a timing of the periodic collection of the data associated with the real-time processing.

12. A non-transitory computer-readable recording medium storing a program causing a computer to:

monitor amounts of buffering data buffered in a plurality of buffering processes of buffering data output from a plurality of subprocesses included in first processing of executing real-time processing with respect to data that is collected periodically from a device on a production line of a factory, each of the plurality of buffering processes including buffering data output from a corresponding subprocess of the plurality of subprocesses included in the first processing and each of the amounts of the buffering data being monitored for a corresponding buffering process of the plurality of buffering processes;

monitor a total amount of buffering data buffered in a plurality of buffering processes of buffering data output from a plurality of subprocesses included in second processing of executing batch processing aperiodically with respect to data indicating a result of processing in the first processing, each of the plurality of buffering processes including buffering data output from a corresponding subprocess of the plurality of subprocesses included in the second processing;

when an amount of buffering data buffered in a buffering process of the plurality of buffering processes included in the second processing is equal to or larger than a threshold value, temporarily stop execution of a subprocess of the plurality of subprocesses included in the second processing, the temporary stopping execution of the subprocess including stopping outputting of data to be buffered in the buffering process; and determine, based on (i) a result of the monitoring of the amounts of buffering data buffered in the plurality of buffering processes included in the first processing and (ii) a result of the monitoring of the total amount of buffering data buffered in the plurality of buffering processes included in the second processing, whether at least one of the processing in the first processing or processing in the second processing is in a predetermined abnormal state.

13. The non-transitory computer-readable recording medium according to claim 12, wherein the program further causing the computer to change length of time of some or all of subprocesses per the aperiodic batch processing with respect to a prior aperiodic batch processing and/or a subsequent aperiodic batch processing.

14. The non-transitory computer-readable recording medium according to claim 12, wherein the program further causing the computer to when said determining determines that the at least one of the processing in the first processing or the processing in the second processing is in the predetermined abnormal state, increasing a timing of the periodic collection of the data associated with the real-time processing.

* * * * *